(12) United States Patent
Kim et al.

(10) Patent No.: US 12,032,823 B2
(45) Date of Patent: Jul. 9, 2024

(54) MOBILE TERMINAL AND ELECTRONIC DEVICE HAVING MOBILE TERMINAL

(71) Applicant: LG ELECTRONICS INC., Seoul (KR)

(72) Inventors: Taehwan Kim, Seoul (KR); Taeoh Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/636,706

(22) PCT Filed: Aug. 22, 2019

(86) PCT No.: PCT/KR2019/010674
§ 371 (c)(1),
(2) Date: Feb. 18, 2022

(87) PCT Pub. No.: WO2021/033808
PCT Pub. Date: Feb. 25, 2021

(65) Prior Publication Data
US 2022/0291829 A1 Sep. 15, 2022

(51) Int. Cl.
*G06F 3/04886* (2022.01)
*G06F 1/16* (2006.01)
(Continued)

(52) U.S. Cl.
CPC ........ *G06F 3/04886* (2013.01); *G06F 1/1647* (2013.01); *G06F 3/0412* (2013.01); *G06F 3/0447* (2019.05); *H04M 1/72427* (2021.01)

(58) Field of Classification Search
CPC .. G06F 3/04886; G06F 3/0447; G06F 1/1647; G06F 3/0412; H04M 1/72427
(Continued)

(56) References Cited

U.S. PATENT DOCUMENTS 9,262,073 B2 * 2/2016 Howard ................ G06F 3/0416
10,275,087 B1 * 4/2019 Smith .................. G06F 3/04817
(Continued)

FOREIGN PATENT DOCUMENTS

KR 10-2016-0023471 A 3/2016
KR 10-2016-0072757 A 6/2016
(Continued)

*Primary Examiner* — Kwin Xie
(74) *Attorney, Agent, or Firm* — Birch, Stewart, Kolasch & Birch, LLP

(57) ABSTRACT

Provided are a mobile terminal and an electronic device comprising a case to which the mobile terminal is coupled, wherein the mobile terminal comprises: a first wired communication unit provided in a terminal body; and a first display unit coupled to the case, and the case comprises: a first body formed to accommodate at least a portion of the terminal body; a second wired communication unit disposed on one side of the first body; a second body on which a second display unit is disposed; and a wiring unit electrically connecting the first and second bodies. In addition, in an activated state of the first and second display units, a control unit of the mobile terminal displays, on the basis of a touch input applied to any one of the first and second display units, a game pad for playing a game application executed in the mobile terminal on the other display unit. While the game application is being played on the any one of the display units, in response to the occurrence of a first touch event that satisfies a preset condition on the game pad, a second touch event that is coordinate-transformed with respect to the first touch event is generated, and the second touch event is delivered to the game application.

19 Claims, 27 Drawing Sheets

(51) Int. Cl.
*G06F 3/041* (2006.01)
*G06F 3/044* (2006.01)
*H04M 1/72427* (2021.01)

(58) Field of Classification Search
USPC .................................................. 345/173–174
See application file for complete search history.

(56) References Cited

U.S. PATENT DOCUMENTS

| | | | |
|---|---|---|---|
| 2013/0207920 A1* | 8/2013 | McCann | G06F 3/04883 345/173 |
| 2014/0098038 A1* | 4/2014 | Paek | G06F 1/1692 345/173 |
| 2015/0234479 A1* | 8/2015 | Schantz | A63F 13/21 345/173 |
| 2016/0124698 A1* | 5/2016 | Reeves | G06F 1/1632 715/761 |
| 2016/0188181 A1* | 6/2016 | Smith | G06F 3/0412 715/765 |
| 2020/0171378 A1* | 6/2020 | Kobayashi | A63F 13/426 |

FOREIGN PATENT DOCUMENTS

| | | |
|---|---|---|
| KR | 10-2016-0124643 A | 10/2016 |
| KR | 10-1885685 B1 | 8/2018 |
| KR | 10-2018-0111397 A | 10/2018 |

\* cited by examiner

FIG. 1B
(a) 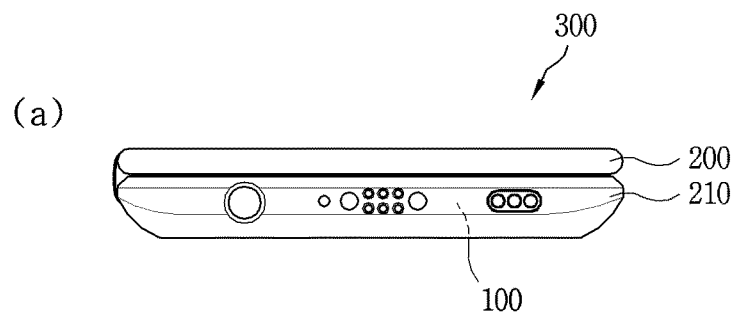
(b) 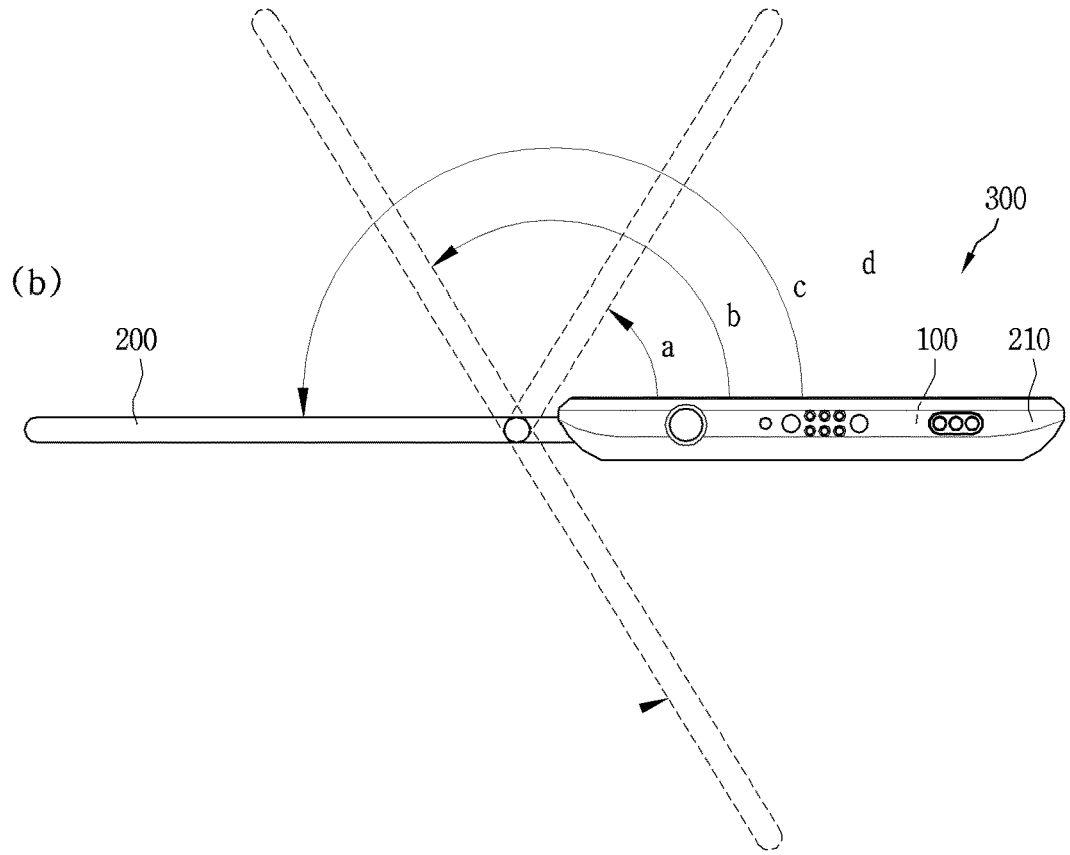
(c) 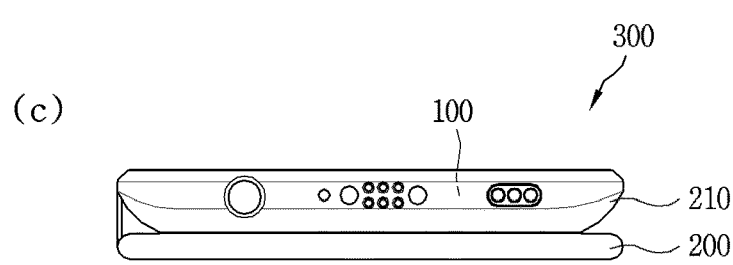

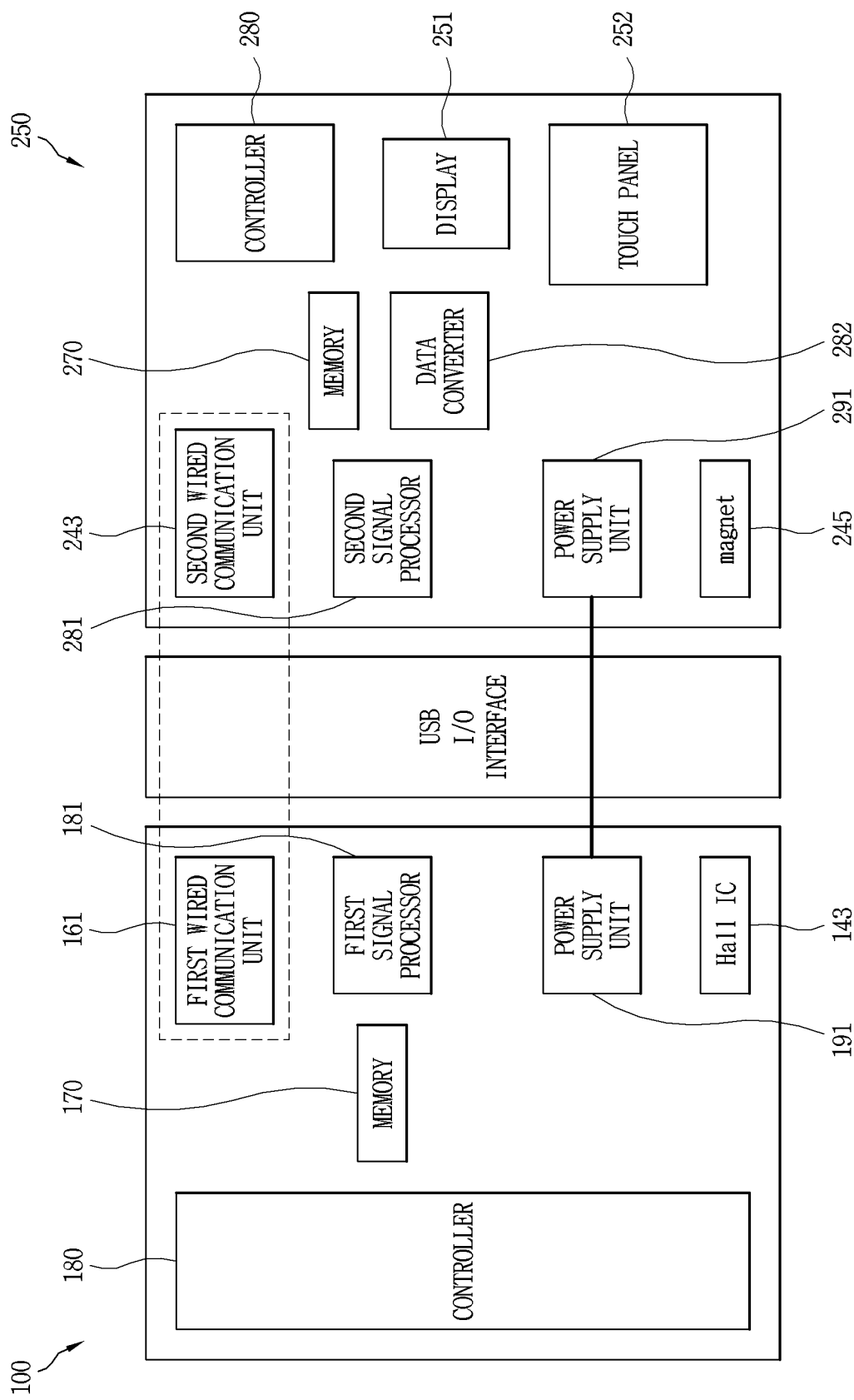

FIG. 6B
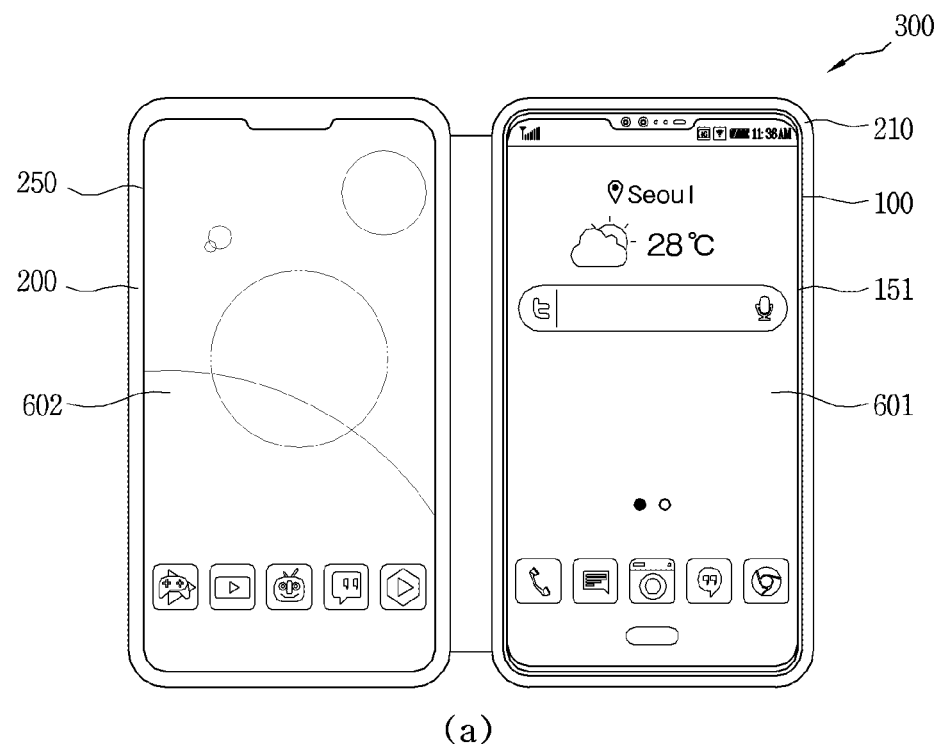
(a)
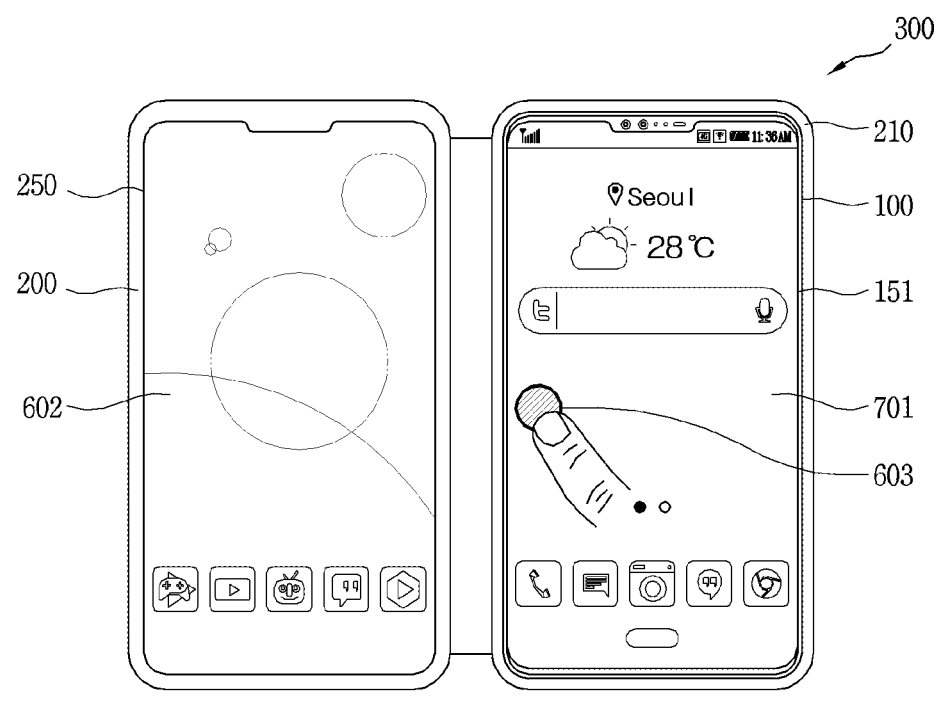
(b)

FIG. 6D
(a)
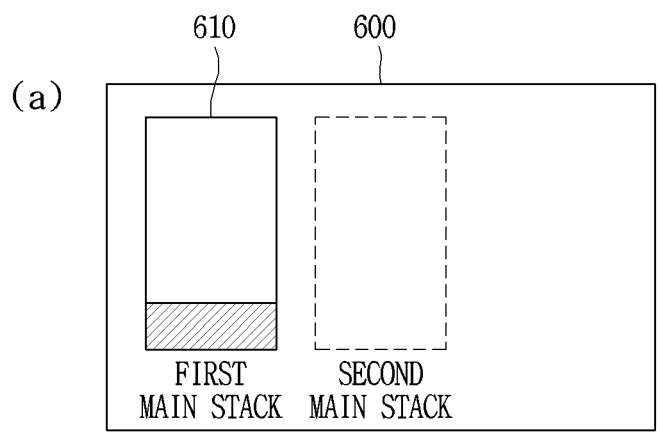
(b)
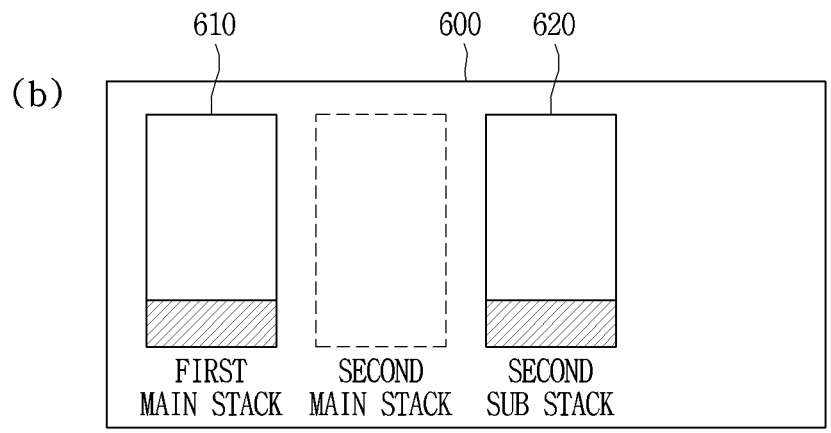
(c)
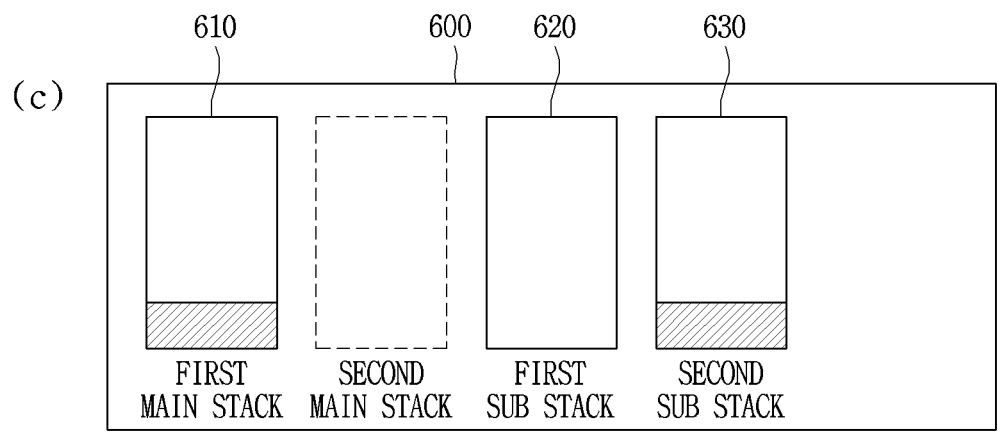

MOBILE TERMINAL AND ELECTRONIC DEVICE HAVING MOBILE TERMINAL

CROSS-REFERENCE TO RELATED APPLICATION

This application is the National Phase of PCT International Application No. PCT/KR2019/010674, filed on Aug. 22, 2019, the entire contents of which are hereby expressly incorporated by reference into the present application.

TECHNICAL FIELD

The present disclosure relates to an electronic device having a mobile terminal and a case to which the mobile terminal is coupled, and a control method thereof.

BACKGROUND ART

Terminals may be divided into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

Meanwhile, in recent years, the usability of a mobile terminal together with an external device interworking with the mobile terminal is being further extended, and compatibility with various models should also be considered in case where the structure of a product is changed to extend the usability of the mobile terminal.

For such an example, the usability is being extended to perform an operation such as a game by providing a virtual input device in the terminal without the need to connect a separate input device thereto.

DISCLOSURE OF INVENTION

Technical Problem

An aspect of the present disclosure is to provide a mobile terminal capable of extending a display region of the mobile terminal through a case having an additional display interworking with the mobile terminal, and an electronic device having a case to which the mobile terminal is coupled.

Another aspect of the present disclosure is to provide an electronic device capable of controlling a display provided in a case through wired communication so as to allow compatibility with various models without using a separate chip for communication.

Furthermore, still another aspect of the present disclosure is to provide an electronic device capable of providing a sense of realism as if an external input device such as a joystick is connected thereto and providing convenience in operation when playing a game using an extended display region interworking therewith through wired communication.

In addition, yet still another aspect of the present disclosure is to provide an electronic device capable of suitably converting a touch operation as well as applying the conversion to a game screen to provide a sense of realism of a touch operation on a gamepad as if it were operated on a hardware device and to improve usability.

Solution to Problem

According to the present disclosure, there is provide an electronic device including a mobile terminal and a case to which the mobile terminal is coupled, wherein the mobile terminal includes a terminal body coupled to the case; a first wired communication unit provided in the terminal body; and a first display coupled to the case, and the case includes a first body disposed to accommodate at least part of the terminal body; a second wired communication unit disposed at one side of the first body; a second body disposed with a second display; and a wiring portion configured to electrically connect the first body and the second body to transmit a signal received from the mobile terminal to the second display when a wired communication path is formed based on a connection to the first and second wired communication units. Furthermore, the controller of the mobile terminal, based on a touch input applied to either one display of the first and second displays while the first and second displays are in active states, may display a gamepad for playing a game application executed by the mobile terminal on the other display, and in response to a first touch event satisfying a preset condition that has been generated on the gamepad while the game application is being played on the either one display, may generate a second touch event coordinate-converted for the first touch event, and may transmit the second touch event to the game application.

Furthermore, according to an embodiment, the preset condition may be a case where a touch position corresponding to the first touch event is located inside a boundary of a virtual joystick displayed on the gamepad, a case where the touch position moves within a first threshold distance, or a case where the touch position moves within a second threshold distance out of the boundary of the virtual joystick, wherein the second touch event is generated based on a touch position of the first touch event.

Furthermore, according to an embodiment, the second touch event may have a coordinate value converted to be processed as an input to the virtual joystick.

Furthermore, according to an embodiment, the first threshold distance may be a value determined by using an initial touch point corresponding to the first touch event as a central axis of a circle, and the second threshold distance may correspond to a value determined based on the boundary of the virtual joystick.

Furthermore, according to an embodiment, the controller of the mobile terminal, in response to the conversion of the first touch event generated on the gamepad displayed on the other display to the second touch event, may control the second touch event instead of the first touch event to be transmitted to the game application being executed on the either one display.

Furthermore, according to an embodiment, the mobile terminal may include a converter that receives a first touch event satisfying a preset condition from a display on which the gamepad is displayed, converts the received first touch event to generate the second touch event. and provides the generated second touch event to the game application or the game application and the gamepad application.

Furthermore, according to an embodiment, when the first touch event is initiated by a virtual joystick of the gamepad, the controller of the mobile terminal may ignore a boundary of the virtual joystick to perform coordinate conversion for successive touch points using the position of the initial touch point of the first touch event as a central axis of a circle, and provide the coordinate-converted second touch event to the game application.

Furthermore, according to an embodiment, in a case where the first touch event is initiated outside a virtual button of the gamepad, when it is determined that an initial touch point of the first touch event is located within a predetermined distance from a boundary of the virtual button, the controller of the mobile terminal may generate a second touch event by converting the coordinates of the first touch event to be generated within a boundary of the corresponding virtual button.

Furthermore, according to an embodiment, when the first touch event is initiated by a virtual button of the gamepad, and a movement of a touch from an initial touch point corresponding to the first touch event is changed from a first direction to a second direction opposite to the first direction, the controller of the mobile terminal may compare areas of the initial touch point and a current touch point, update the coordinates of the current touch point based on a result of the comparison, and convert the touch point based on the updated coordinates to generate the second touch event.

Furthermore, according to an embodiment, when the first touch event is initiated outside a virtual button of the gamepad and a plurality of virtual buttons exist in a region adjacent to an initial touch point corresponding to the first touch event, the controller of the mobile terminal may update the coordinates of a touch point for the selected virtual button according to a preset condition, and convert the touch point based on the updated coordinates to generate the second touch event.

Furthermore, according to an embodiment, when a touch-down event is generated from a first virtual button of the gamepad and a touch-up event is generated while out of the first virtual button, and then a touch-down event is generated again within an effective region from a touch point corresponding to the touch-up event within a predetermined period of time, the controller of the mobile terminal may determine the first virtual button as a virtual button selected according to the preset condition.

Furthermore, according to an embodiment, the controller of the mobile terminal may set an effective region having a predetermined size in all directions out of a boundary for the plurality of virtual buttons, respectively, on the gamepad, and recognize an effective region in which an initial touch point corresponding to the first touch event is located among a plurality of virtual effective regions, and determine a specific virtual button corresponding to the recognized effective region as a virtual button selected according to the preset condition.

Advantageous Effects of Invention

As described above, according to a mobile terminal and an electronic device having the mobile terminal according to the present disclosure, during the execution of a game application, a gamepad may be provided through an extended display region without using a separate peripheral device, thereby further improving user experience and realism during the execution of the game, and more efficiently controlling a play operation of the game application executed on the mobile terminal.

Specifically, a touch position of a touch event generated from the gamepad is transmitted to a manager of a game application corresponding to a game screen executed on another screen, and then a screen conversion or operation mapped thereto is applied to the game screen. Accordingly, usability is further improved even when the game screen and the gamepad are independently activated in different regions/screens/devices.

BRIEF DESCRIPTION OF DRAWINGS

FIGS. 1A and 1B are conceptual views for explaining an electronic device according to the present disclosure.

FIGS. 2A, 23, 2C, and 2D are conceptual views for explaining a main structure of an electronic device according to the present disclosure.

FIG. 4 is a block diagram for explaining a control method between a mobile terminal and a display provided in a case in an electronic device according to the present disclosure.

FIGS. 6A, 6B, 6C, and 6D are conceptual views for explaining control between displays and a memory control method based thereon according to the present disclosure.

MODE FOR THE INVENTION

Figure 1A:
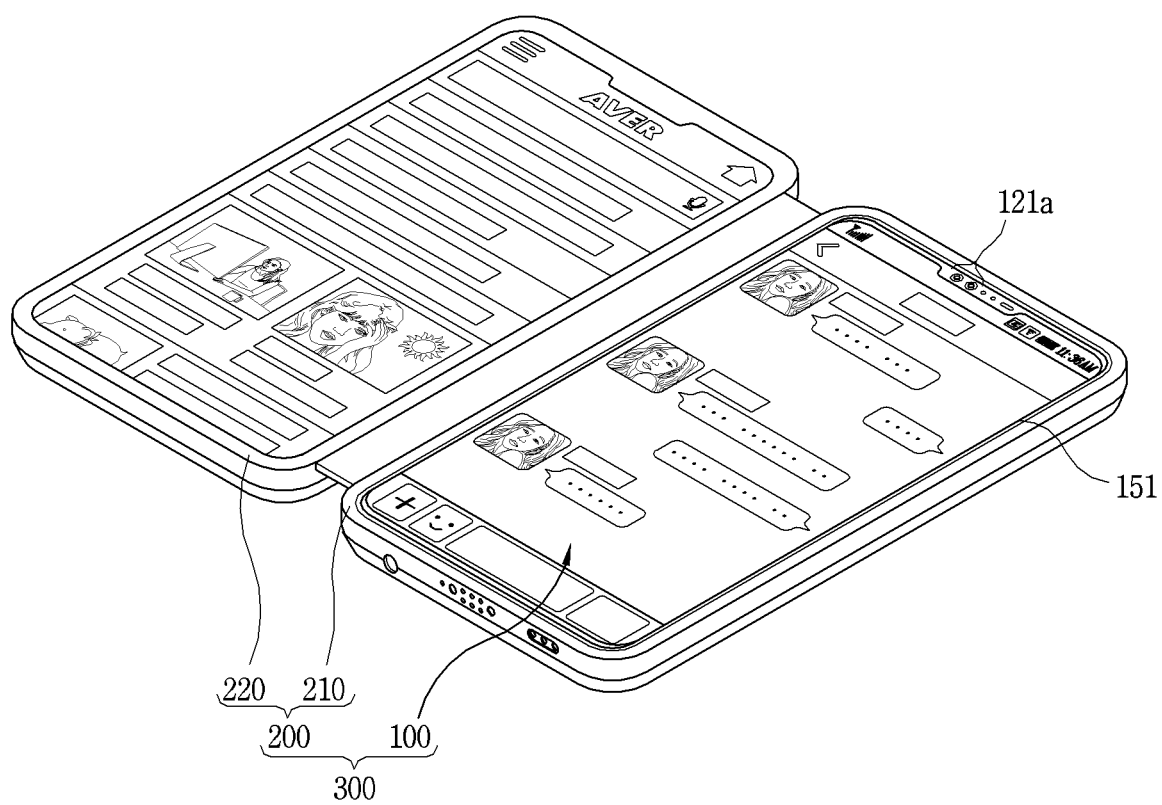

Hereinafter, FIGS. 1A and 1B are conceptual views for explaining an electronic device according to the present disclosure.

Referring to the drawings, a mobile terminal 100 is coupled to a case 200, and the mobile terminal 100 and the case 200 are coupled to constitute one electronic device 300.

In this case, the mobile terminal may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra-books, wearable devices (for example, smart watches, smart glasses, head mounted displays (HMDs)), and the like. Details of the mobile terminal will be described later with reference to FIG. 3.

The case 200 may be a pouch that protects outer surfaces of the mobile terminal 100 or covers or accommodates at least one surface of the mobile terminal 100 as an accessory of the mobile terminal 100. The case 200 may be configured to expand a function of the mobile terminal 100 in combination with the mobile terminal 100.

Meanwhile, in the present disclosure, information output from the mobile terminal may be processed in association with a structure or a function of the case 200. For example, referring to FIG. 1A, the case 200 may include a display (hereinafter, referred to a "second display 250") interworking with a display (hereinafter, a "first display 151") of the mobile terminal.

The case may include a first body 210 and a second body 220 that are rotatably connected to each other, and the display 250 may be disposed on any one of the first body 210 and the second body 220.

For example, the first body 210 may be disposed to accommodate at least a portion of the mobile terminal body. As a rear side of the mobile terminal is accommodated in the first body 210, and the first display 151 disposed on a front side of the mobile terminal is exposed outside.

In addition, there may be provided at least one hole at one side of the first body 210, so that at least a part of components of the mobile terminal exposed outside the case performs a function when the mobile terminal 100 is coupled to the first body 210.

Here, the mobile terminal 100 may be detachably coupled to the first body 210. In addition, the mobile terminal may be configured to detect whether the mobile terminal is coupled to the first body 210. For the detection, the first body 210 may include a magnet 245 at one side thereof facing the mobile terminal 100, and the mobile terminal may include a hall sensor 143 at the rear side thereof which is configured to sense a magnetic field corresponding to the magnet 245 when the mobile terminal is coupled to the first body. When the magnetic field is sensed by the hall sensor, the mobile terminal may recognize that it is coupled to the case, and then perform predetermined control.

For example, when a magnetic field is sensed by the hall sensor 143, a controller 180 of the mobile terminal 100 may supply an operating current to the second display 250 provided on the second body 220 or perform a preparation process into a state capable of transmitting a signal to the second display 250. That is, the preset control may denote an operation related to the preparation process.

Here, the 'preparation process' denotes a standby state in which the controller of the mobile terminal 100 can immediately perform a next process when an operating current is supplied to the second display 250. Therefore, even if the magnetic field is sensed by the hall sensor 143, a current is not immediately supplied to the second display 250.

Meanwhile, when it is detected that a connector provided at one side of the first body 210, for example, at a lower end of the first body 210 and a connection port provided at a lower end of the mobile terminal accommodated in the first body 210 are mutually coupled, the controller 180 of the mobile terminal may supply an operating current to the second display 250 provided on the second body 220.

Specifically, an operating current may be supplied from a battery of the mobile terminal 100 to a circuit board on the second display 250 through a flexible printed circuit board (FPCB) connected by the connector and a wiring portion (e.g., a coaxial cable) provided in a connection portion 230 of the case 200.

To this end, the controller 180 of the mobile terminal may be configured to recognize resistances Ra, Rd in the first body 210 through a specific contact pin of the connector provided in the first body 210, detect a coupling of the connector and the connection port, and accordingly supply an operating current. This will be described in more detail below.

The second display 250 provided on the second body 220 may be configured to operate based on power supplied from the mobile terminal 100.

The second display 250 may be disposed on the second body 220 to extend a display region of the first display 151 or may be operated independently of the first display 151. For example, contents related to information outputted on the first display 151 may be mirrored to be outputted on the second display 250.

In addition, execution screens of different applications may be outputted on the first display 151 and the second display 250, respectively. As another example, an execution screen of one application may be divided and outputted to the first display 151 and the second display 250. Also, screens corresponding to different execution steps or different tasks of one application may be outputted on the first display 151 and the second display 250.

Furthermore, the mobile terminal 100 is configured to control screen information output to the second display 250, and for this purpose, a communication link for wired communication (e.g., a USB 2.0 communication link) may be established between the mobile terminal 100 and the second display 250.

Meanwhile, both the first display 151 and the second display 250 are exposed outside in open state, and the open state may be defined with reference to FIG. 1B.

Referring to FIG. 1B, the first body 210 and the second body 220 of the case 200 may rotate with respect to each other between a closed state in (a) of FIG. 1B and a flip state in (c) of FIG. 1B.

The closed state is the state in (a) of FIG. 1B, wherein the first body 210 of the case 200 is covering the first display 151 of the mobile terminal 100. Here, the first display 151 is covered by the first body 210. That is, the closed state may be a state in which the first display 151 is covered by the second display 250. In the closed state, the mobile terminal 100 and the case 200 overlap each other in a thickness direction of the mobile terminal, and thus form a diary-like shape, thereby improving user portability.

In the closed state, a body of the mobile terminal 100 accommodated in the first body 210 may not be exposed outside. In addition, in the closed state, a sub-display 250*a* to display notification information corresponding to a specific event generated from the mobile terminal 100 may be exposed from one side of a front surface of the second body 220 including the second display 250.

In the closed state, the second body 220 is rotated relative to the first body 210 to be changed to the open state.

The open state is a state in which the first display is not covered by the second display 250, and between the first display 151 and the second display 250 forms a specific angle other than 0 degrees.

Specifically, the open state may be one of a 'first state' in which the first display 151 and the second display 250 form about 60 degrees (a), a 'second state' in which the first display 151 and the second display 250 form about 120 degrees (b), a 'third state' in which the first display 151 and the second display 250 form about 180 degrees (c), and a 'fourth state' in which the first display 151 and the second display 250 form about 270 degrees (d), as illustrated in (b) of FIG. 1B.

In the open state, the first body 210 and the second body 220 may be fixed at a specific angle to become any one of the first to fourth states, and a fixing member to fix the bodies at a specific angle may be provided in the case 200.

The controller 180 of the mobile terminal may control the mobile terminal to perform different operation modes in any one of the first to fourth states. For example, in the first state, the mobile terminal may operate in a 'privacy protection mode', and in the second state, the mobile terminal may operate in a 'laptop mode'. In addition, in the third state, the mobile terminal may operate in a 'display extension mode', and in the fourth state, may operate in a 'multi-display mode'.

A state in which the first display 151 and the second display 250 are exposed outside is defined as the 'open state'. In the 'open state', the first display 151 is not covered by the second display 250. Accordingly, a state in which the first display 151 is covered by the second display 250 is defined as the 'closed state'. The open state and the closed state may be distinguished by a sensing value of an illuminance sensor provided on a front surface of the first display 151.

Meanwhile, as illustrated in (c) of FIG. 1B, a state in which the first display 151 and the second display 250 rotate with respect to each other by 360 degrees such that a rear surface of the first body 210 on which the first display 151 is disposed is completely covered by a rear surface of the second body 220 on which the second display 250 is disposed may be defined as a 'flip state' in the open state. In the 'flip state', the first display 151 and the second display 250 are exposed outside to face opposite directions to each other.

In the flip state, components provided on the rear surface of the mobile terminal 100 coupled to the first body 210, for example, the rear camera 121*b*, the optical output module 154, and the flash 124, the user input unit 123*a* may be detected by recognizing a state covered by the rear surface of the second body 220.

In addition, the first state to the fourth state, and the flip state may be detected by a separate sensor provided in the connection portion 230 that couples the first and second bodies 210, 220 to be relatively rotatable or separate sensors provided on rear surfaces of the first and second bodies 210, 220.

The electronic device 300 of the present disclosure may perform an operation of controlling the first display 151 and the second display 250 interworking with the open state and closed state. As an example, when the first display 151 and the second display 250 are operated in inactive state in the closed state and are changed from the closed state to the open state, at least one of the first display 151 and the second display 250 may be activated.

As an example, when changed to the open state, both the first display 151 and the second display 250 may be changed to active state. Here, different home screen pages may be output to the first display 151 and the second display 250, respectively, or identical home screen pages may be displayed on the first display 151 and the second display 250. In addition, various information may be outputted on the first display 151 and the second display 250 according to circumstances.

As another example, when changed to the open state, the first display 151 is switched to active state, and the second display 250 may be maintained in the inactive state.

The second display 250 may include a touch sensor configured to sense a touch applied to the second display 250. Also, the second display 250 may be configured to sense a touch even in the inactive state.

In relation to the touch sensed by the touch sensor, the second display 250 may be operated in active state when a preset type of touch is applied to the second display 250 in the open state. Alternatively, the second display 250 may be operated in active state based on a touch applied to the first display 151 in the open state.

Meanwhile, when a touch is applied to the second display 250, the second display 250 may transmit a touch signal corresponding to the touch to the mobile terminal 100. Then, when the touch according to the received touch signal corresponds to a preset type of touch, the mobile terminal 100 may transmit a signal corresponding to a control command to activate the second display 250 to the second display 250 side.

Then, the second display 250 and the controller of the second display 250 may be activated based on the signal received from the mobile terminal 100.

The transmission and reception of the signal may be performed by a wired communication method combining the connector provided on one side of the first body 210 and the connection port provided on the mobile terminal 100.

Meanwhile, a structure of the case to implement the operation of the electronic device described above will be described in more detail below.

Figure 2A:
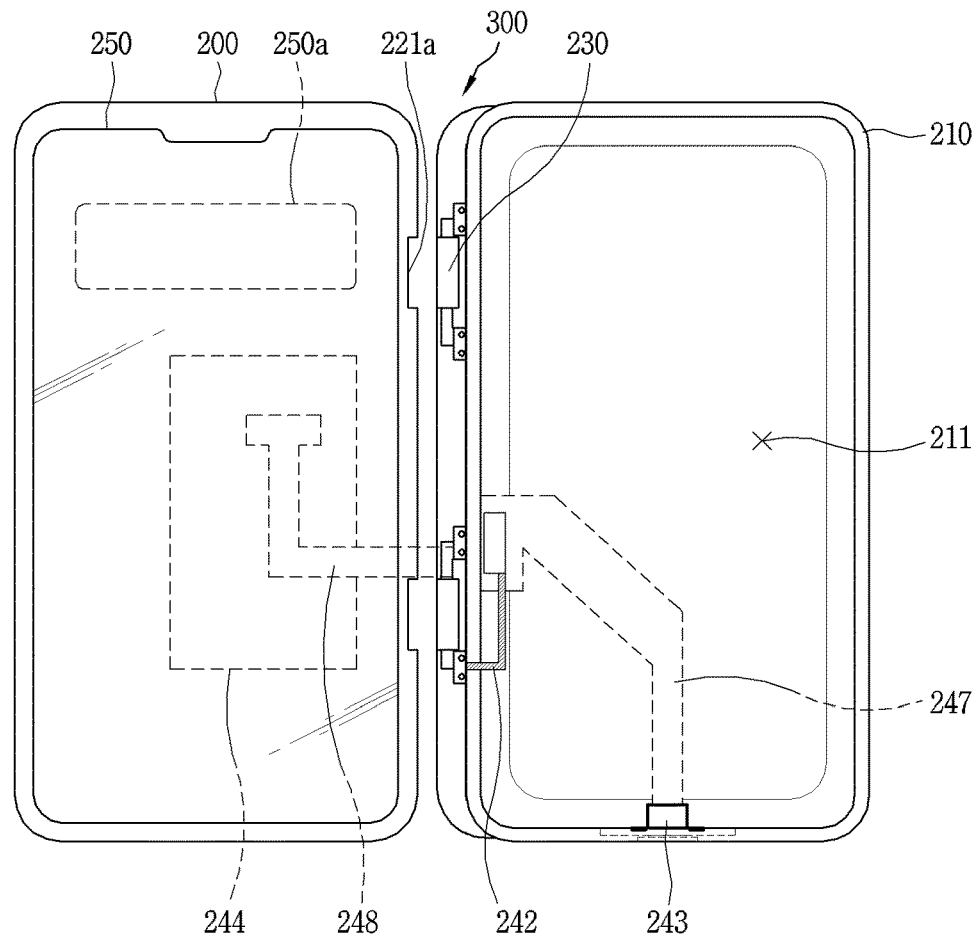

Referring to FIG. 2A, the first body 210 of the case 200 includes an accommodating space 211 configured to accommodate a rear surface of the body of the mobile terminal. The first body accommodates at least a portion of the mobile terminal in the accommodating space 211, and the rear surface of the mobile terminal is disposed on a bottom surface of the accommodating space 211.

The second body 220 on which the second display 250 is disposed is rotatably coupled to the first body by the connection portion 230. That is, the connection portion 230 is disposed between the first body 210 and the second body 220 to couple the first body 210 and the second body 220 so that the first body 210 and the second body 220 are relatively rotatable.

The sub-display 250*a* to display predetermined information, for example, time information or event notification, may be provided on a front side of the second body 220. In this case, a simple event notification can be immediately checked through the sub-display 250*a* in the closed state without switching the electronic device 300 to the open state.

Referring to FIGS. 2A to 2D, the second body 220 may include a first cover 221, a second cover 222, and the second display 250. A receiving groove 221*a* that accommodates at least a part of the connection portion 230 may be disposed in the first cover 221. In addition, the second cover 222 is coupled to the first cover 221, and may be a frame in which various electronic components are mounted. As such an example, a circuit board 248 on the second display 250 side, which will be described later, may be mounted on the second cover 222.

The second cover 222 may be rotatably coupled to the connection portion 230, and a groove may be disposed at a position corresponding to the receiving groove 221*a* of the first cover 221 on the second cover 222, and the connection portion 230 may be disposed in the groove 222*a*. In this case, the second display 250 may be mounted on the second cover 222.

In addition, a signal transmitted from the controller of the mobile terminal is transmitted to the second display 250 side through a wiring portion 242, for example, a coaxial cable, provided on an inner side of the connection portion 230 and connected to a flexible printed circuit board 247 provided on a rear side of the first body 210. Hereinafter, the flexible printed circuit board provided on the rear side of the first body 210 and combined with the wiring portion 242 of the connection portion 230 will be referred to as a 'first flexible printed circuit board' 247. In addition, a flexible printed circuit board provided on a rear side of the second body 220 and combined with the wiring portion 242 of the connection portion 230 is referred to as a 'second flexible printed circuit board' 248.

The connection portion 230 may include a first hinge 231 and a second hinge 232 spaced apart along a side surface of the first body 210. The first hinge 231 and the second hinge 232 may each include a hinge body 233 and a hinge shaft 234.

A hinge groove (not shown) is disposed in the hinge body 233, and the hinge shaft 234 is inserted into the hinge groove so that the first and second bodies 210, 220 can rotate relative to each other. The hinge shaft 234 may be provided in plural, and coupling portions 235 coupled to the first body 210 and the second body 220, respectively, may be disposed on one side of the hinge shaft 234.

In addition, the wiring portion 242, for example, a coaxial cable, to be connected to a first flexible printed circuit board 247 and a second flexible printed circuit board 248 is provided on the inner side of the connection portion 230.

A connector 243*a* protruded toward the accommodating space 211 accommodating the mobile terminal and inserted into the connection port provided on one side of the mobile terminal body may be disposed on one side of the first body 210. To this end, at least one hole H through which at least a portion of a connector module including the connector 243*a* penetrates may be disposed on one side of the first body 210, for example, a side surface of a lower end.

Although not all illustrated, the connector 243*a* may be disposed to be rotatable 180 degrees toward the outside of the case, or may be disposed to be drawn in or out of the case by external force. In this case, even if there exists the connector 243, the mobile terminal body can be easily accommodated in the first body 210.

Alternatively, in one example, the first body 210 may be detachable in a vertical direction or at least an upper portion of the first body 210 may be made of a flexible material so that the mobile terminal body can be easily accommodated in the first body 210.

The connector module in which the connector 243*a* is installed may be mounted on one side of the first body 210, for example, at a center of a lower end. The connector 243*a* may be installed at one end of the connector module, and a charging port having a female pogo pin to be coupled to an external male pin may be installed at another end.

The connector 243*a* may be connected to a circuit board 244 to control the second display 250 through the first flexible printed circuit board 247, the second flexible printed circuit board 248, and the wiring portion 242. In addition, the connector 243*a* may be connected to the circuit board 244 through coupling with the connection port of the mobile terminal body. Here, the connection port provided in the mobile terminal body may denote, for example, a USB port.

A side of the second display 250 performs wired communication with the mobile terminal 100 through the first and second flexible circuit boards 247, 248, the wiring portion 242, and the circuit board 244 coupled through the connector 243. Furthermore, the mobile terminal 100 performs wired communication with the second display 250 through a connection port connected to the connector 243. In this regard, the connection port of the mobile terminal 100 may be referred to as a 'first wired communication unit', and the connector 243 of the case may be referred to as a 'second wired communication unit'.

A first wired communication unit 161 and a second wired communication unit 243 may perform USB communication. The first wired communication unit 161 may perform USB I/O communication to transmit a signal to the case side through the second wired communication unit 243.

In addition, the second wired communication unit 243 may perform USB I/O communication to transmit a signal to the mobile terminal through the first wired communication unit 161. Here, the USB I/O communication may refer to USB 2.0 or USB 3.0 communication.

A USB (Universal Serial Bus), which is a common connector, is defined as an interface standard that enables connection of various peripheral devices. In the USB (Universal Serial Bus), a host necessarily exists, and communication is performed by a control through the host.

Figure 2B:
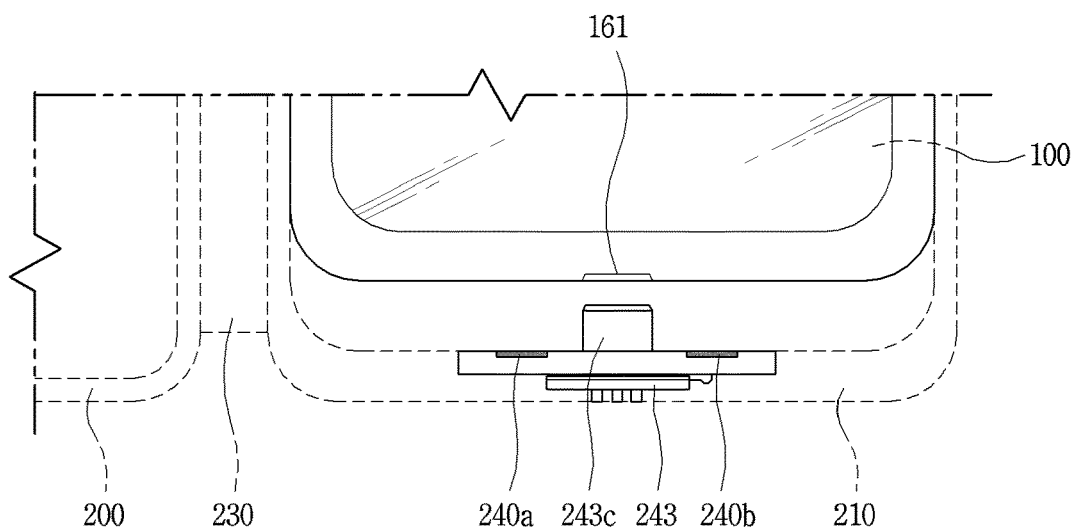
Figure 2C:
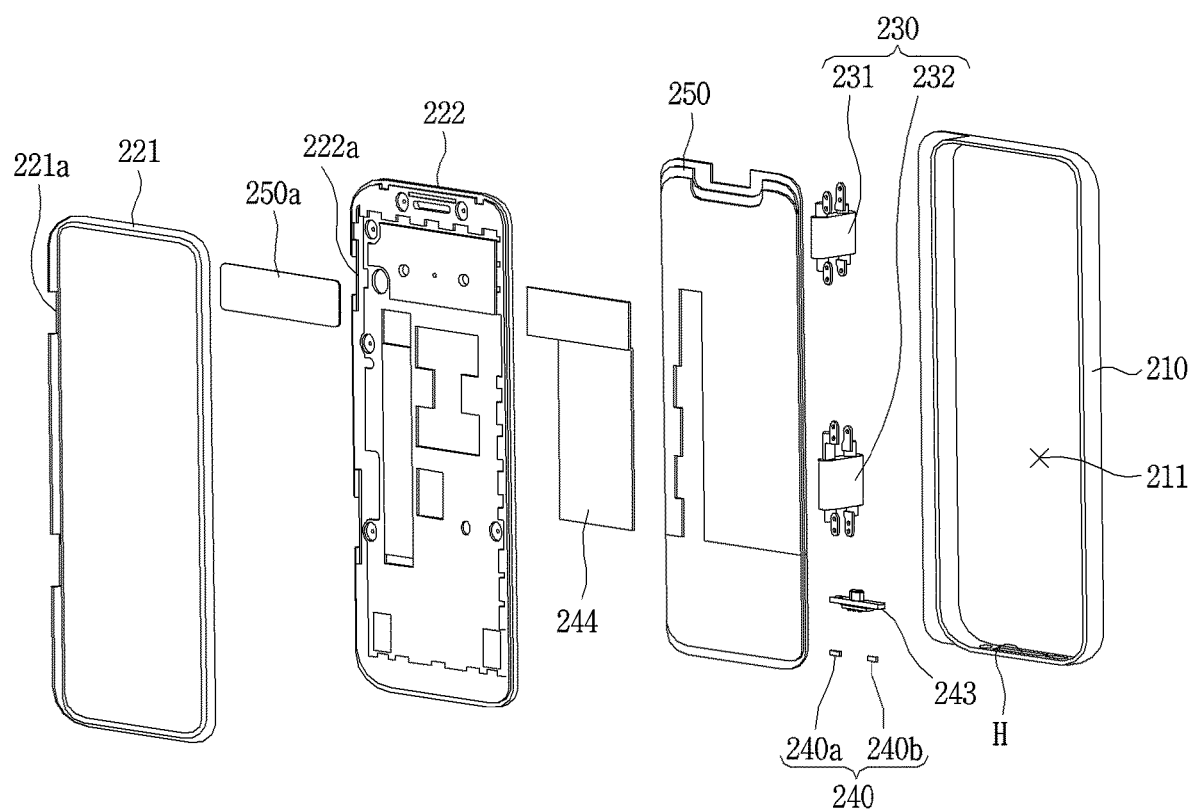
Figure 2D:
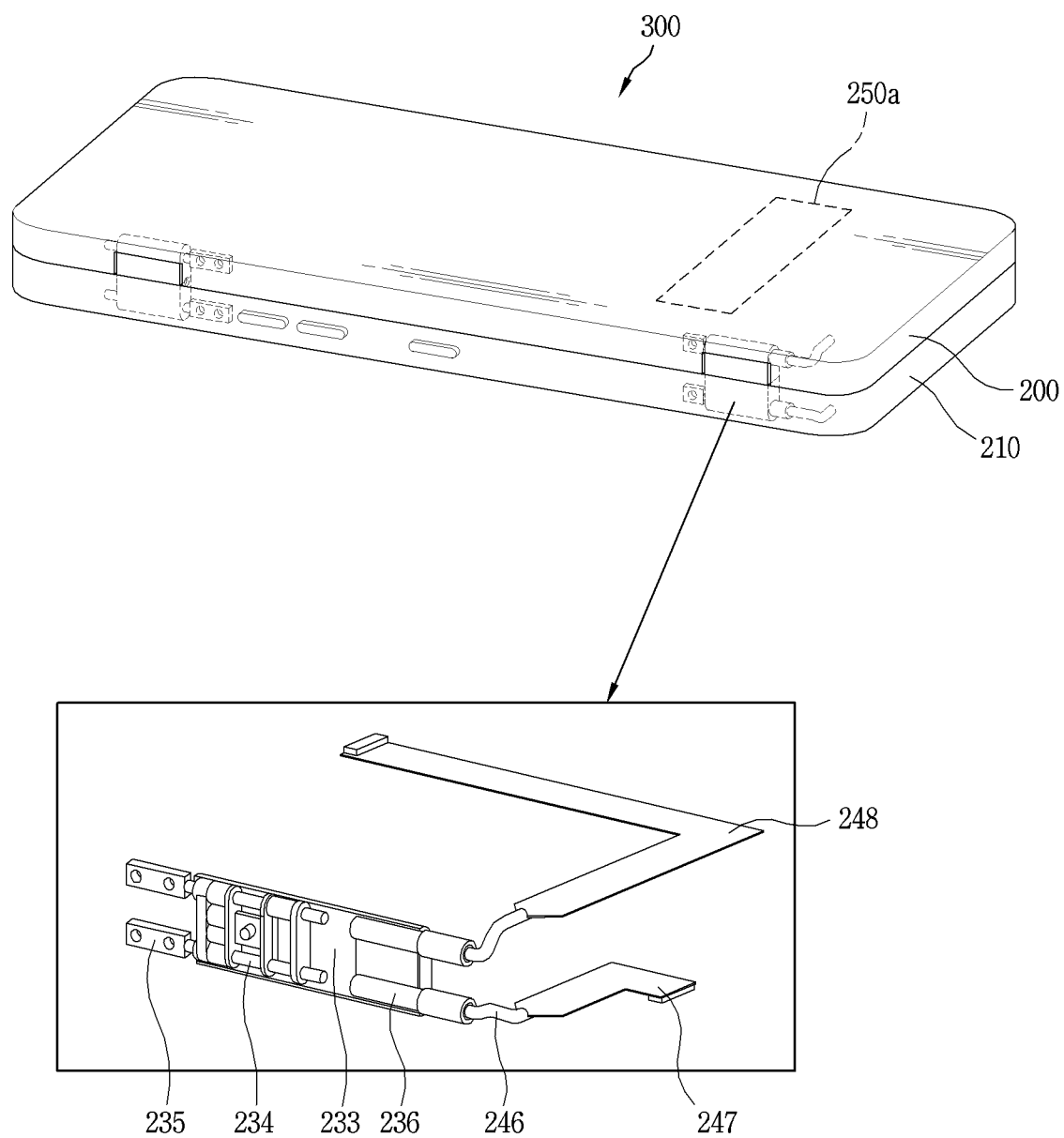

Referring to FIG. 2B, the connector 243 provided at the lower end of the first body 210 of the case and connected to the connection port of the mobile terminal may be mounted on the connector module. One end of the connector 243 is joined to a supporting member of the connector module, and another end of the connector 243 may define a protrusion 243*c*. The connector 243 is connected to the connection port of the mobile terminal as the protrusion 243*c* is inserted in a direction from the outside to inside of the mobile terminal.

A plurality of contact pins (e.g., male pins) may be provided inside the connector, and each of the plurality of contact pins may be set to perform a specific function when connected to pins of the connection port of the mobile terminal (e.g., female pins). This will be described in more detail below.

Meanwhile, according to FIG. 2A, the first body 210 is provided with the first flexible circuit board 247 connected to the connector 243. The first flexible circuit board 247 may be connected to the second flexible printed circuit board 248 and the circuit board 244 at a side of the second display 250 through the wiring portion 242, for example, a coaxial cable, inside the connection portion 230.

In this way, the first body 210 does not have a separate circuit board for wireless communication or the like other than the first flexible printed circuit board 247, so that the first body 210 becomes thinner, and the mobile terminal also does not need to have a separate circuit board for wireless communication. Accordingly, a compatibility of the mobile terminal mountable in the case is further improved, and an overall thickness of the electronic device can be fabricated thinner.

According to the drawing, the first body 210 and the second body 220 are coupled to the circuit board 244 via the wiring portion 242 coupled to the first and the second flexible printed circuit boards 247, 248, and they are electrically connected to each other. The circuit board 244 may be connected to the second display 250 to transmit a signal received from the mobile terminal 100 to the second display 250.

That is, the circuit board 244 may transmit data transmitted and received from the mobile terminal through the first wired communication unit 161 and the second wired communication unit 243 to the second display 250.

The wiring portion 242 electrically connects the first body 210 and the second body 220 through the connection portion 230. For this connection, a connection passage through which the wiring portion 242 passes may be disposed in the connection portion 230.

As an example of this, the first hinge 231 and the second hinge 232 have an accommodating space accommodating at least a part of the wiring portion 242. For example, the wiring portion 242 connected to the first flexible printed circuit board 247 that is coupled with the second wired communication unit 243 may be accommodated in the second hinge 232. In addition, the first hinge 231 and the second hinge 232 may be defined in a mutually symmetrical structure or shape.

The first wired communication unit 161 and the second wired communication unit 243 may be disposed at a lower side of the case 200 and the mobile terminal 100. In this case, the first flexible printed circuit board 247 connected to the wiring portion 242 may also be disposed to be connected to one of the first hinge 231 and the second hinge 232 from the lower side.

In addition, the second hinge 232 may include an extending portion 236 extending from the hinge body 233, and the extending portion 236 may include cables 246 extended to the first body 210 and the second body 220, respectively. The accommodating space is disposed in the extending portion 236, and the cables 246 are accommodated in the accommodating space. The first flexible printed circuit board and second flexible printed circuit boards 247, 248 are disposed at both ends of the cables 246, and the first and second flexible printed circuit boards 247, 248 are electrically connected to the circuit board 244. According to the structure, a signal controlling the second display 250 is transmitted from the mobile terminal to the first body 210 and the second body 220 through the first wired communication unit 161 and the second wired communication unit 243.

Meanwhile, referring to the drawings, at the lower end of the first body 210 of the case, there may be disposed the connector 243a connected to the connection portion of the mobile terminal so that the second display 250 and the circuit board 244 receive power from the mobile terminal. The connector 243a supplies power of the mobile terminal to the circuit board 244 through the first flexible printed circuit board 247, the wiring portion 242, and the second flexible printed circuit board 248, and the circuit board 244 provides the power to the second display 250.

According to the structure, power supplied to the second display 250 and a signal transmitted to the second display 250 may be transmitted through a wired path in the mobile terminal.

According to the above-described structure, the electronic device performs an operation of controlling the first display 151 and the second display 250 to interwork with each other using wired communication and a wired power supply path. Hereinafter, the structure and the function of the mobile terminal will be described first, and then the control operation will be described.

Figure 3A:
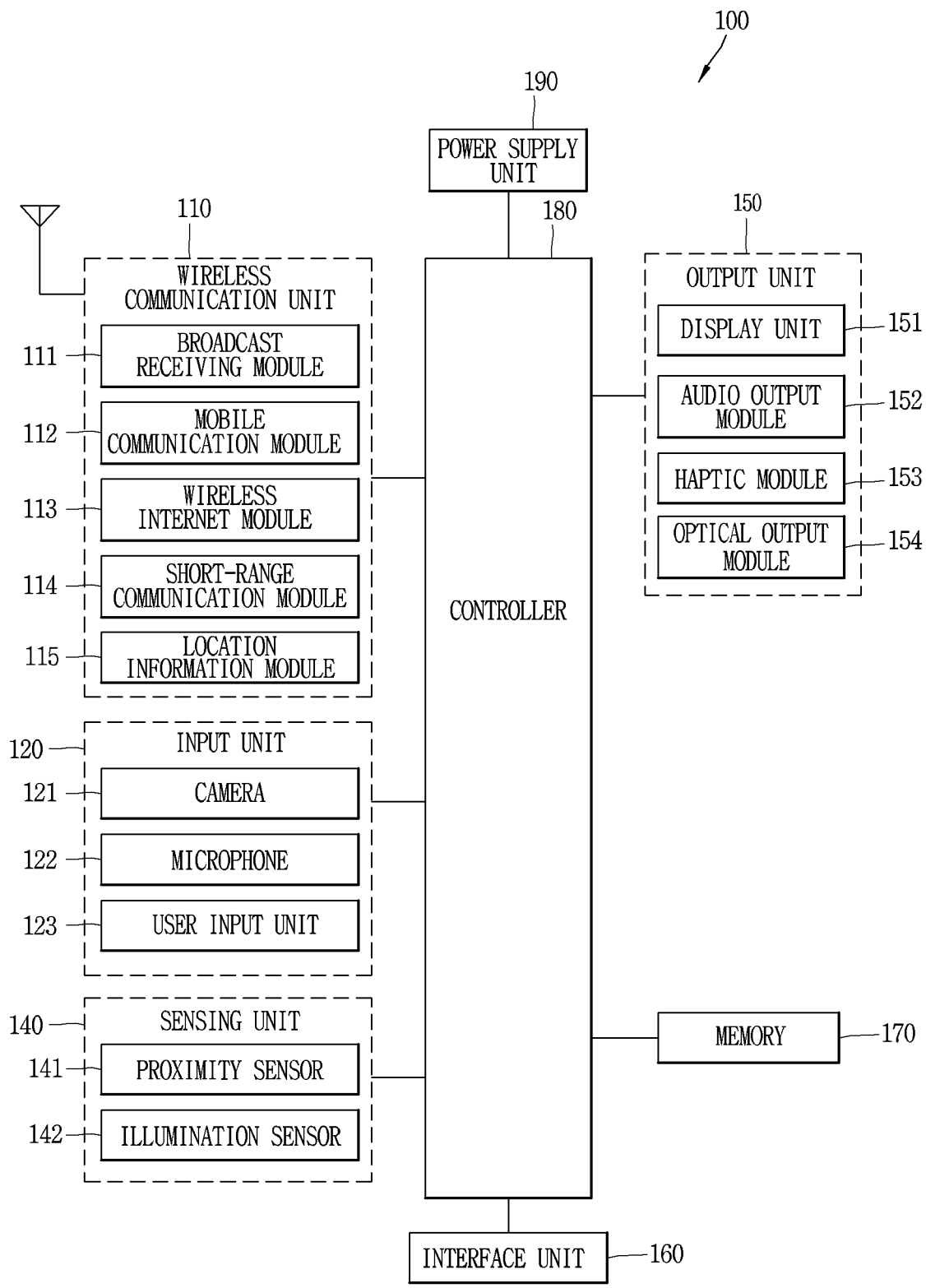
FIGS. 3A, 3B and 3C are conceptual views for explaining an example of a mobile terminal related to the present disclosure.
Figure 3B:
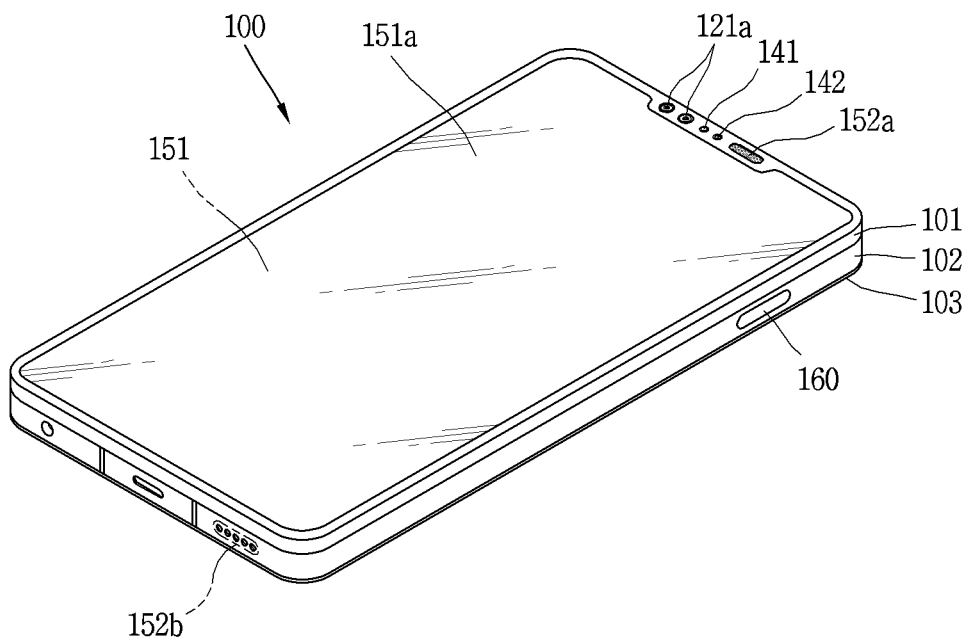
Figure 3C:
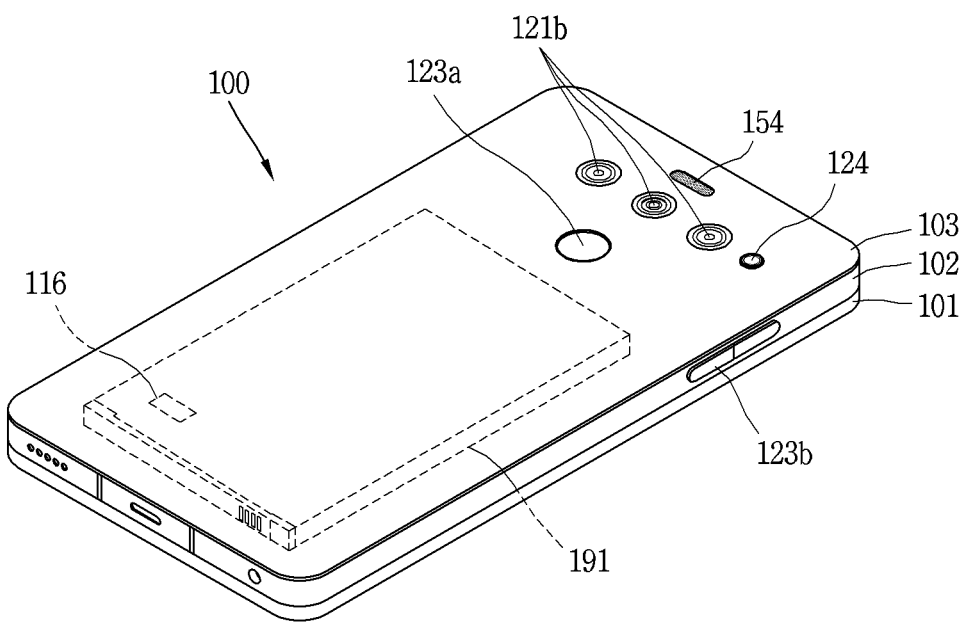

FIGS. 3A, 3B and 3C are conceptual views for explaining an example of a mobile terminal related to the present disclosure. The mobile terminal 100 according to the present disclosure may be coupled to a case of the electronic device described above.

Referring to FIGS. 3A through 3C, FIG. 3A is a block diagram for explaining a mobile terminal associated with the present disclosure, and FIGS. 3B and 3C are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. The components shown in FIG. 3A are not essential for implementing a mobile terminal, and thus the mobile terminal described herein may have more or fewer components than those listed above.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display 151, an audio output module 152, a haptic module 153, an optical output module 154, and the like. The display 151 may have an inter-layered structure or an integrated structure with a touch sensor in order to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 3A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSDPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wipro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi). Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), capable of exchanging (interworking) data with the mobile terminal 100. The short-range communication module 114 may sense (or recognize) a wearable device capable of communicating with the mobile terminal 100 in the vicinity of the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

The input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes an image frame, such as still picture or video, acquired by an image sensor in a video phone call or image capturing mode. The processed image frames may be displayed on the display 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include various noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or ore of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor can sense a touch applied to the touch screen, such as display 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display 151 or a capacitance generated from a specific part of the display 151, into electric input signals. The touch sensor may be configured to detect a position, an area where a touch object applying a touch onto the touch screen is touched on the touch sensor, a pressure at the time of touch, a capacitance at the time of touch, and the like. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. Meanwhile, the controller 180 may calculate the location of a wave generating source through information sensed from the optical sensor and the plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display 151 displays (outputs) information processed by the mobile terminal 100. For example, the display 151 may display execution screen information of an application program driven in the mobile terminal 100 or user interface (UI) and graphic user interface (GUI) information in response to the execution screen information.

Furthermore, the display 151 may also be implemented as a stereoscopic display for displaying stereoscopic images.

The stereoscopic display may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. A device having the identification module (hereinafter, an "identification device") may be fabricated in the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may execute or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring now to FIGS. 3B and 3C, the mobile terminal 100 is described with reference to a bar-type terminal body. However, the present disclosure may not be necessarily limited thereto, and may be also applicable to various structures such as a watch type, a clip type, a glasses type, a folder type in which two or more bodies are coupled to each other in a relatively movable manner, a flip type, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space disposed between the front case 101 and the rear case 102. At least one middle case may be additionally positioned between the front case 101 and the rear case 102.

The display 151 may be disposed on a front surface of the terminal body to output information. As illustrated, a window 151a of the display module 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Meanwhile, the rear cover 103 may be provided with an opening portion for exposing the camera 121b, the optical output module 154, the flash 124, the rear input unit 123a, and the like to the outside.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this example, a mobile terminal 100 having a unibody formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproof portion may include a waterproof member provided between the window 151a and the front case 101, between the front case 101 and the rear case 102, or between the rear case 102 and the back cover 103, to hermetically seal an inner space when those cases are coupled to each other.

The mobile terminal 100 may include a display 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160, and the like.

Hereinafter, as illustrated in FIGS. 1B and 1C, the mobile terminal 100 will be described as an example in which the display 151 the first audio output module 152a, the proximity sensor 141, the illumination sensor 142, and the first camera 121a are disposed on a front surface of the terminal body, the second manipulation unit 123b, the second audio output module 152b, the microphone 122, and the interface unit 160 are disposed on a side surface of the terminal body, and the optical output module 154, the manipulation unit 123a, the second camera 121b, and the flash 124 are disposed on a rear surface of the terminal body.

However, the foregoing configuration may not be necessarily limited to the arrangement. The foregoing configuration may be excluded, substituted or disposed on another surface if necessary. For example, the manipulation unit may not be disposed on the front surface of the terminal body, and the second audio output module 152b may be disposed on the rear surface other than the side surface of the terminal body.

The display 151 displays (outputs) information processed by the mobile terminal 100. For example, the display 151 may display execution screen information of an application program driven in the mobile terminal 100 or user interface (UI) and graphic user interface (GUI) information in response to the execution screen information.

The display 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display 151 may be implemented in two or more in number according to a configured aspect of the mobile terminal 100. For instance, a plurality of the displays 151 may be arranged on one surface to be spaced apart from or integrated with each other, or may be arranged on different surfaces.

The display module 151 may include a touch sensor which senses a touch onto the display module 151 so as to receive a control command in a touching manner. Accordingly, when a touch is applied to the display module 151, the touch sensor may sense the touch, and a controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display 151 may form a touch screen together with the touch sensor. Here, the touch screen may serve as the user input unit 123 (see Fla 3A). In some cases, the touch screen may replace at least some of the functions of the user manipulation unit.

The first audio output module 152a may be implemented as a receiver for transferring voice sounds to the user's ear and the second audio output module 152b may be implemented in the form of a loud speaker for outputting various alarm sounds or multimedia reproduction sounds.

The window 151a of the display 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently disposed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event check is sensed, the controller 180 may control the optical output module 154 to end the output of light.

The first camera 121a may process video frames such as still or moving images acquired by the image sensor in a video call mode or a capture mode. The processed video frames may be displayed on the display 151 or stored in the memory 170.

The manipulation units 123a and 123b are examples of the user input unit 123, which may be manipulated by a user to input a command for controlling the operation of the mobile terminal 100. The manipulation units 123a and 123b may employ any method if it is a tactile manner allowing the user to perform manipulation with a tactile feeling such as touch, push, scroll or the like. In addition, the manipulation units 123a and 123b may also employ a method of allowing the user to perform manipulation without a tactile feeling through a proximity touch, a hovering touch, or the like.

The manipulation unit 123a may be configured with a mechanical key, or a combination of a touch key and a push key. In addition, the manipulation unit 123a may be configured in a layered form with a fingerprint sensor.

The content input by the manipulation units 123a and 123b may be set in various ways. For example, the first and the second manipulation units may receive a command such as menu, home key, cancel, search, or the like, and may receive a command, such as controlling a volume level being output from the first or second audio output module 152a or 152b, switching into a touch recognition mode of the display 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display 151, or the like. The rear input unit may be implemented into a form allowing a touch input, a push input or a combination thereof.

The rear input unit may be disposed to overlap with the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger recognition sensor may be integrated into the display 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement a stereo function in conjunction with the first audio output module 152a, and may be also used to implement a speakerphone mode during a call.

At least one antenna for wireless communication may be disposed on the terminal body. The antenna may be installed in the terminal body or disposed on the case. For example, an antenna which configures a part of the broadcast receiving module 111 (see FIG. 3A) may be retractable into the terminal body. Alternatively, an antenna may be disposed in a form of film to be attached onto an inner surface of the rear cover 103 or a case including a conductive material may serve as an antenna.

A power supply unit 190 (see FIG. 3A) for supplying power to the mobile terminal 100 may be disposed on the terminal body. The power supply unit 190 may include a battery 191 which is mounted in the terminal body or detachably coupled to an outside of the terminal body.

The battery 191 may receive power via a power source cable connected to the interface unit 160. Furthermore, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may interwork with the display 151 to extend the function of the mobile terminal 100. Another example of the accessory may be a touch pen for assisting or extending a touch input onto a touch screen.

Meanwhile, the electronic device according to the present disclosure is configured in such a manner that the connection port of the interface unit 161 provided on one side (e.g., lower end of side surface) of the mobile terminal, that is, the first wired communication unit 161 and the connector provided at one side of the first body 210 of the case 200, i.e., the second wired communication unit 243 are combined together to supply power and to perform wired communication for transmission and reception of various signals.

Here, it has been described that the wired communication is performed using a USB I/O interface standard. However, it is not limited thereto, and it should be noted that other interface standards for wired communication may be applied.

Hereinafter, a method for performing wired communication between the first wired communication unit 161 and the second wired communication unit 243 will be described in more detail with reference to the accompanying drawings. FIG. 4 is a conceptual view for explaining a control method between a mobile terminal and a display provided in a case in an electronic device according to present disclosure.

The mobile terminal 100 according to the present disclosure may be coupled to the first body 210, and when the mobile terminal 100 is coupled to the first body 210, the connector 243 provided in the first body 210 is inserted into the connection port provided in the mobile terminal 100, and wired communication may be performed through the first and second wired communication units 161, 243.

At this time, the first body 210 on the case side becomes a host device of the mobile terminal, and may perform wired communication, for example, USB communication, with the mobile terminal 100.

The first wired communication unit 161 provided in the mobile terminal 100 may be included in the interface unit 160 described with reference to FIG. 3A. The interface unit 160 includes a plurality of contact pins, and is configured to identify a host device connected to the contact pins by the controller 180 of the mobile terminal.

The first wired communication unit 161 may be provided on a side surface of the lower end of the mobile terminal 100. In addition, the second wired communication unit 243 may be provided to correspond to a position in contact with the first wired communication unit 161 when the mobile terminal 100 is accommodated in the first body 210 of the case. That is, the second wired communication unit 243 may be provided on a side surface of the lower end of the first body 210.

In the present disclosure, when the mobile terminal 100 is accommodated in the first body 210, and the connector pin of the second wired communication unit 243 provided in the first body 210 is inserted into the port of the first wired communication unit 161 of the mobile terminal, wired communication, for example, USB I/O communication, may be performed through the first wired communication unit 161 and the second wired communication unit 243.

Accordingly, the mobile terminal 100 may supply an operating current to the second display 250 through the USB I/O interface, and transmit a control signal or an image signal. Also, in the second display 250, a touch signal may be transmitted to the mobile terminal 100 through the USB I/O interface to process the touch signal corresponding to the touch input applied to the second display 250.

Meanwhile, supply of the above-described operating current and transmission of the control signal and the image signal may be performed through different wired communication paths, To this end, the first wired communication unit 161 and the second wired communication unit 243 may include a plurality of connector pins, and may be set to use different contact pins according to the type of the transmitted signal.

Since the second wired communication unit 243 is inserted into the first wired communication unit 161 and coupled to the case, a plurality of contact pins molded in the second wired communication unit 243 is exposed to the outside. In the present disclosure, a structure in which the plurality of contact pins includes, for example, 12 pins has been described as an example.

Meanwhile, although not illustrated, the first and second wired communication units 161, 243 may have a waterproof member (not shown) molded together with the plurality of contact pins to prevent fluid from outside or to prevent fluid from moving inside. In addition, the waterproof member may be replaced with an O-ring having an elastic force.

The second wired communication unit 243 provided in the first body 210 is configured to transmit and receive wired data from the mobile terminal to the second display 250 through the wiring portion 242 included in the connection portion 230. In addition, the second wired communication unit 243 may communicate with the first wired communication unit 161 to perform unidirectional communication (data flow from the mobile terminal 100 to the second display 250) or bidirectional communication (bidirectional data flow between the mobile terminal 100 and the second display 150).

The first and second wired communication units 161, 243 according to the present disclosure may include a contact-type connector method. For example, the contact-type connector method may include a USB-C type connector or a lightning cable method.

In addition, the first wired communication unit 161 and the second wired communication unit 243 may be configured to transmit and receive various types of data in a wired communication method. For example, it may be one of graphic data, audio data, video data, touch event data, data related to control, and a combination thereof.

Meanwhile, the second display 250 provided in the second body 220 may be configured to operate based on power supplied from the power supply unit 191 of the mobile terminal 100.

Here, the power may be transmitted to the second display 250 and the circuit board 244 provided on the second body 220, through the connector 243 connected to the connection port of the mobile terminal 100, the wiring portion 242 coupled to the first flexible printed circuit board 247 and provided in the connection portion 230, and the second flexible printed circuit board 248, as described above.

The power supply unit 191 of the mobile terminal 100 is configured to supply an operating current (or power) to a power supply unit 291 of the second display 250 through an electric connection path of the first wired communication unit 161 connected to the connection port, the first flexible printed circuit board 247, the wiring portion 242 provided in the connection portion 230, and the second flexible printed circuit board 248 provided in the second body 220. Here, the action current is supplied to the second display 250 through a specific contact pin provided in the first wired communication unit 161, for example, a 'CC1' pin of a USB C-type.

Meanwhile, the mobile terminal 100 may be detachably coupled to the first body 210. In addition, the mobile terminal may be configured to detect whether the mobile terminal is coupled to the first body 210, For the detection, the first body 210 may include a magnet 245 at one side thereof facing the mobile terminal 100, and the mobile terminal may include a hall sensor 143 at the rear side thereof which is configured to sense a magnetic field corresponding to the magnet 245 when the mobile terminal is coupled to the first body. When the magnetic field is sensed by the hall sensor, the mobile terminal may recognize that it is coupled to the case, and then perform predetermined control.

Here, the preset control does not denote supplying an operating current as described above.

When the first and second wired communication units 161, 243 are connected to enable mutual communication, the mobile terminal 100 may recognize a plurality of resistances Ra, Rd disposed in the first body 210 by specific contact pins (e.g., CC1, CC2) among a plurality of contact pins included in the first wired communication unit 161 provided in the first body 210. When the plurality of resistances are recognized as described above, an operating current is supplied to the second display 250 by supplying the power, for example, Vconn to CC1.

When an operating current is supplied to the second display 250, a system of the second display 250 is booted and initialized, and becomes an operable standby state.

Here, the second display 250 is either in active state or in inactive state, and even when the second display 250 is inactive, a touch sensor (or a touch panel 252) provided in the second display 250 is operated in an active state to sense a touch applied to the second display 250.

On the other hand, when the second display 250 is activated, the controller of the mobile terminal 100 transmits an image signal corresponding to screen information to be displayed on the display 251 provided on the second display 250 to the second wired communication unit 243 side through the first wired communication unit 161. Here, the wired communication path of the video signal is different from the above-described wired communication path for power supply.

For example, the power may be supplied to the second display 250 through a wired communication path through the CC1 pin provided in the second wired communication unit 243, and the image signal may be transmitted to the second display 250 through a wired communication path through the USB SS1 and SS2 pins.

Data may be received from the first wired communication unit 161 to the second display 250 through the second wired communication unit 243 and the circuit board 244. Here, a digital image signal may convert the data into a form that can be outputted on the second display 250 through a data converter 282. For example, the second display 250 may be configured as an LCD panel. And here, the digital image signal of a DP format received from the mobile terminal 100 may be converted into a data format (MIPI format) that can be received on the LCD panel through the data converter 282 to be transferred and outputted on the display 251.

Meanwhile, data transmitted and received through the first wired communication unit 161 and the second wired communication unit 243 may be transmitted and received using different contact pins in the USB I/O interface according to a type of the data.

Specifically, for example, the image signal may be transmitted and received from the mobile terminal 100 to the second display 250 through a USB SSPHY pin, and may be converted into a format that can be outputted on the second display 250 (e.g., MIPI format) through the data converter 282. In addition, for example, a control signal related to the operation of the second display 250 may be transmitted and received to the second display 250 through an external display port (EDP) AUX pin.

Signals that need to be transmitted between the mobile terminal 100 and the display 250, such as communication control signals, touch signals, and brightness control signals, can be transmitted and received through a first and a second signal processor 181, 281 using a second USB human interface device (HID) communication.

Here, in the mobile terminal 100 in an initial state, the first signal processor 181 transmits and receives signals through the first USB communication by using A6 and A7 pins on an A side, and B6 and B7 pins on a B side of the connector. Meanwhile, the first and second wired communication units 161, 234 are connected to enable mutual communication, and when a plurality of resistances Ra, Rd is recognized through the CC1 pin, they are switched by switches and the A side pins and B side pins used in the initial state are separated to transmit and receive signals by using the second USB communication only using B6 and B7 pins on the B side.

As described above, when switches are switched to process signals by using the second USB communication, the first and second signal processors 181, 281 may perform 12C conversion by USB human interface device (HID) communication to perform an operation corresponding to a touch applied to the second display 250, for example, transmission of a touch signal corresponding to the touch. Also, the first and second signal processors 181, 281 may support hot plug detect (HPD) communication between the controller 280 and the data converter 282 through the second USB communication.

Meanwhile, initialization of the second display 250 may be controlled by the controller 280 included in the second display 250.

As aforementioned, the mobile terminal according to the present disclosure may control information output to the display 250 provided in the case 200. That is, the operation of the second display 250 may be controlled by the mobile terminal 100. To this end, the case 200 to which the mobile terminal is coupled may be identified when the connection port of the mobile terminal and the connector provided in the case 200 are connected and a plurality of resistances are recognized. Therefore, since there is no need to provide a separate chip for communication between the mobile terminal and the case 200 in the present disclosure, the case 200 is compatible with various models of mobile terminals, cost can be saved, and a thickness of the case 200 can be thinner.

Figure 5:
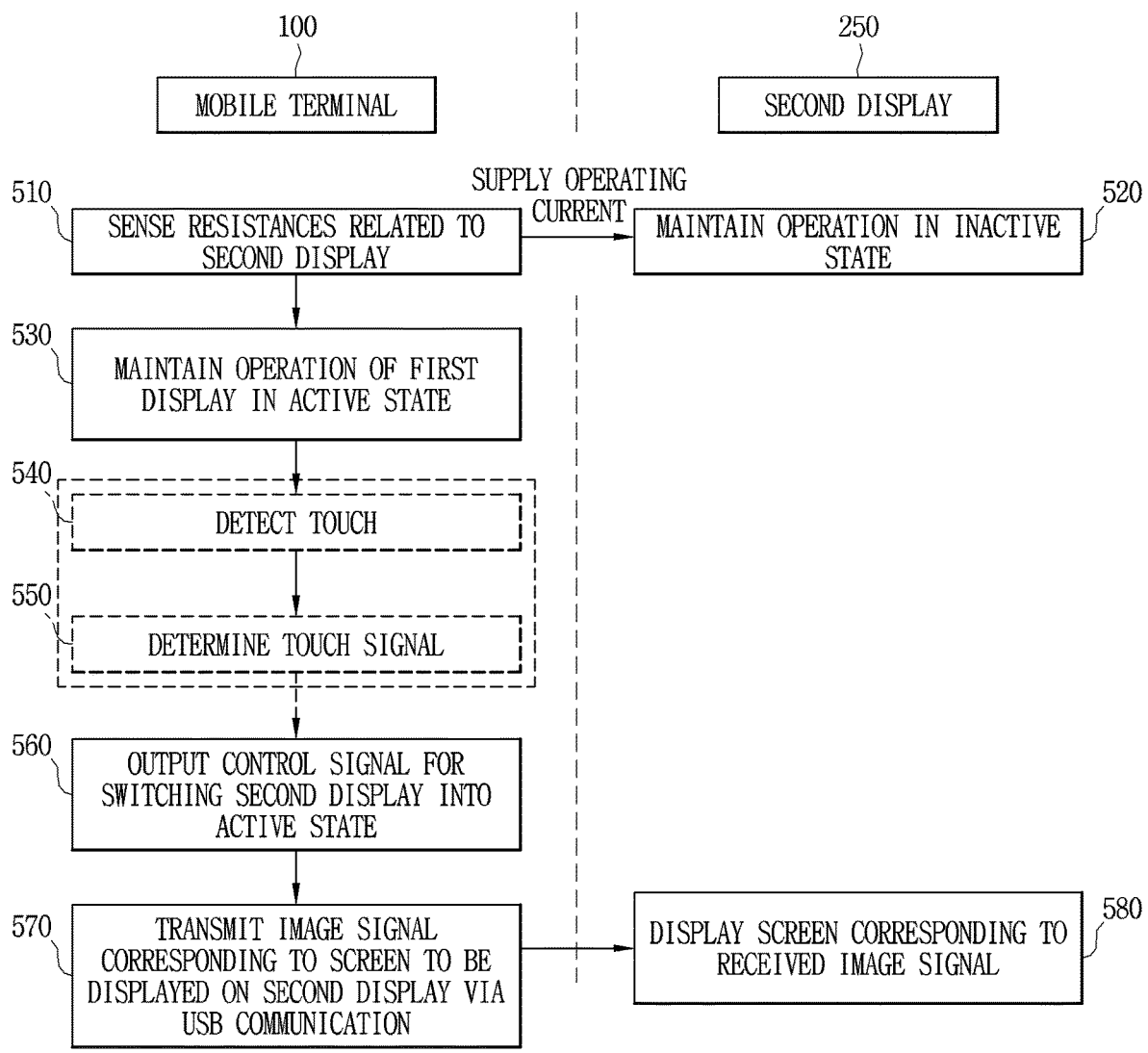
FIG. 5 is a flowchart for explaining a control method between a mobile terminal and a display provided in a case in an electronic device according to the present disclosure.

Hereinafter, a control method between the mobile terminal and the display provided in the case will be described in more detail with reference to the accompanying drawings, based on the above descriptions. FIG. 5 is a representative flowchart for explaining a control method between a mobile terminal and a display provided in a case in an electronic device according to the present disclosure.

As described above, in an electronic device 300 according to the present disclosure, when the mobile terminal 100 is coupled to the case 200, the mobile terminal 100 can sense a resistance corresponding to the second display 250 (510).

Specifically, when the connection port of the mobile terminal 100 is connected to the connector provided on one side of the case 200, the mobile terminal 100 may recognize a plurality of resistances provided with the connector to determine whether to supply an operating current to the second display 250.

When the plurality of resistances is recognized, an operating current is supplied from the mobile terminal 100 to the second display 250 through the connector, and the second display 250 can maintain an operation in the inactive state (520).

Specifically, when the plurality of resistances is recognized, the mobile terminal 100 operates in a host mode to supply the action current to the connector in a downstream manner. That is, the connection port of the mobile terminal 100 is switched to become a Downstream Facing Port (DFP) to supply an operating current to the contact pin. For example, an operating current is supplied in a form of Vconn power through the CC1 pin among the contact pins of the connector.

In this case, the second display 250 on the case 200 side operates in a device mode to receive the action current in an upstream manner. That is, the connector of the case 200 is operated as an upstream facing port (UFP).

As described above, the operating current supplied through the CC1 pin of the connector is supplied to the circuit board 244 or the likes of the second display 250 through the wiring portion 242 coupled to the first and second flexible printed circuit boards 247, 248 as described above. In addition, an operating current is also supplied to the power unit 291 of the second display 250.

Meanwhile, as described above, the electronic device 300 may be either in an open state and a closed state, and when a transition from the closed state to the open state is detected, the first display 151 provided in the mobile terminal may maintain the operation in the active state (530). At this time, the transition from the closed state to the open state may be detected by recognizing a sensing value of the illuminance sensor provided on the front side of the mobile terminal 100, for example.

Alternatively, even when the connection port of the mobile terminal 100 is connected to the connector provided on one side of the case 200, and an input is applied to the first display 151 or the user input unit 123 in a state where the electronic device 300 is in the open state, the first display 151 may maintain the operation in the active state.

As described above, when a preset ouch input is applied to the first display 151 while the second display 250 is maintained in the inactive state, the mobile terminal detects such a touch (540), and determines a touch signal corresponding to the detected touch (550).

When the touch signal is for switching the second display 250 into active state as a result of the determination, the controller of the mobile terminal may output a control signal for switching the second display 250 into the active state (560).

As another example, when a transition of the electronic device 300 from the closed state to the open state is detected and accordingly the first display 151 provided in the mobile terminal is operated in active state, the second display 250 may be operated in a state switched from inactive state to active state after a predetermined time (e.g., 0.5 second to 1 second) has elapsed. That is, a screen of the second display 250 may be turned on. after a predetermined time has elapsed after a screen of the first display 151 was turned on.

In this case; the above-described steps 540 and 550 are omitted, a step of detecting whether the electronic device 300 is switched from the closed state to the open state may be added before performing the step of operating the first display 151 in active state (530).

Meanwhile, as another example, although not illustrated, when a preset touch input is applied to the second display 250 while the second display 250 is operating in inactive state, a control signal to switch the second display 250 to active state may be transmitted from the mobile terminal 100.

In this case, signal processing corresponding to the touch signal sensed by the second display 250 may be performed by the first signal processor 181 and the second signal processor 281 as described above.

Specifically, the mobile terminal 100 performs wired communication in an initial state by using the first USB communication, then when the mobile terminal 100 is connected to the connector of the case 200 and recognizes the plurality of resistances Ra, Rd corresponding to the second display 250, the mobile terminal 100 controls the operation corresponding to the touch by using the second USB communication connected only with the B side contact pins (e.g., B6 and B7).

Even when the second display 250 is deactivated, the touch sensor (or touch panel 252) provided in the second display 250 is operated in active state to sense a touch applied to the second display 250.

The sensed touch may be I2C converted through the first and second signal processors 181, 281. In addition, the sensed touch is transferred from the second display 250 to the mobile terminal 100 via the circuit board 244 provided on the second body of the case, the wiring portion 242 coupled with the first and second flexible printed circuit boards 247, 248, and the connector, that is, the second wired communication unit 243.

Then, the mobile terminal 100 determines the touch signal transmitted from the second display 250 as described above, and determines whether the touch signal corresponds to a preset touch input. Here, the preset touch input may refer to, for example, applying a plurality of tabs on the second display 250 in inactive state.

When the touch signal is determined to correspond to the preset touch input, the mobile terminal 100 may perform the process of step 560 described above. That is, a control signal for switching the second display 250 to an active state may be output by the controller of the mobile terminal 100 to be transmitted to the second display 250.

Thereafter, the mobile terminal 100 may transmit an image signal corresponding to a screen to be outputted on the second display 250 via USB communication (570).

To this end, the first and second wired communication units 161, 243 transmit, for example, the DP format image signal through a USB SS PHY pin. Specifically, the DP format image signal passes through the wiring portion 242 coupled with the first and second flexible printed circuit boards 247, 248 after passing through the first wired communication unit 161 and the second wired communication unit 243 interconnected to each other, is converted to MIPI format by the data converter 282 of the second display 250, and is transferred to the second display 250.

Next, the second display 250 may display a screen corresponding to the received signal, that is, an image signal converted to MIPI format [580]. Here, a type of the screen displayed on the second display 250 is not particularly limited. For example, it may be a home screen page different from a home screen page displayed on the first display 151 or an execution screen of a preset application.

Hereinafter, a flow process of an operation according to the present disclosure as described above will be described in detail with reference to FIGS. 6A to 6D in connection with the allocation of a memory stack.

Figure 6A:
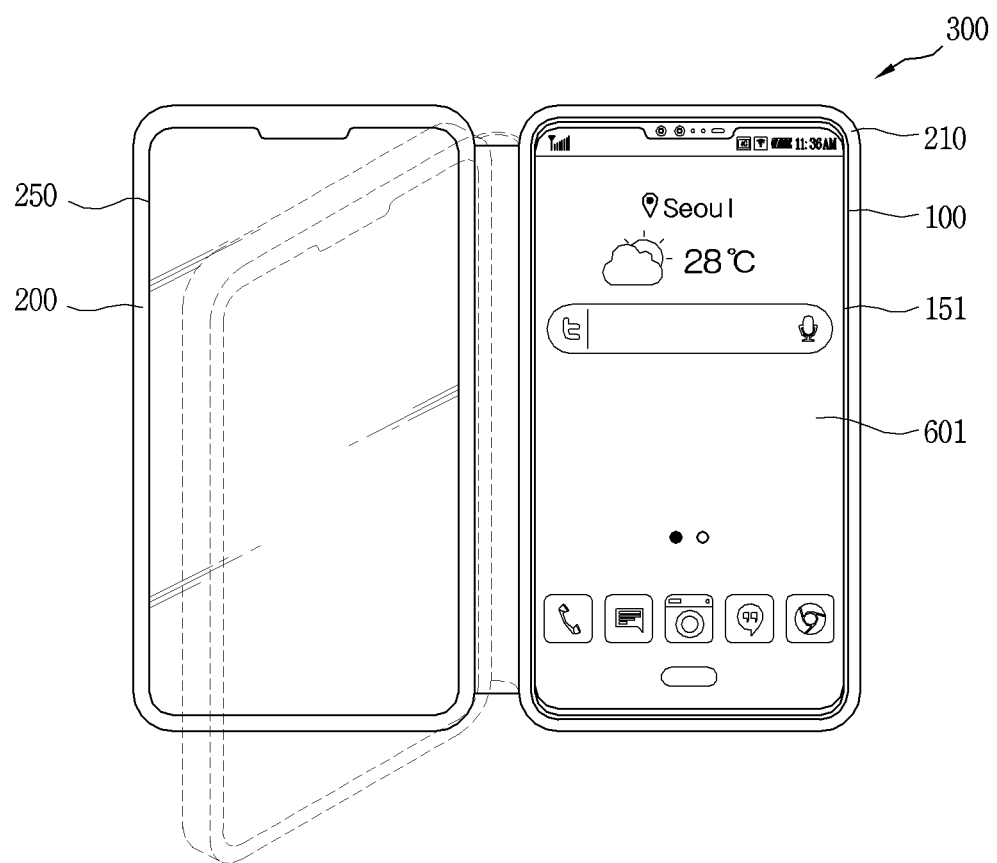

Firstly, FIG. 6A illustrates a state in which the connection port of the mobile terminal is connected to the connector of the case, the first display 151 maintains the active state while the electronic device 300 is open, and the second display 250 on the case 200 side is in inactive state in the electronic device 300 according to the present disclosure.

When the connection port of the mobile terminal is connected to the connector of the case to sense a plurality of resistances corresponding to the second display 250, an operating current is supplied to the second display 250 and the circuit board 244 of the case through the first wired communication unit 161, the second wired communication unit 243, and the wiring portion 242.

First screen information may be displayed on the activated first display 151. Here, a type of the first screen information is not limited. For example, the first screen information may be a first home screen page 601 as illustrated in FIG. 6A, and in other examples, the first screen information may be changed in various ways such as an execution screen of a specific application, a web page, a setting screen, etc. according to a setting or a selection of a user.

With respect to the first home screen page 601 being displayed on the first display 151 in active state, a main home stack 610 for the first display 151 may be allocated on a memory 600 of the mobile terminal 100, as illustrated in (a) of FIG. 6D. In addition, tasks related to the displaying of the first home screen page 601 may be stacked on the allocated main home stack 610.

Here, the stacking may be one of structures that stacks (PoP) data. A structure of stacking data may be of a stack type and a queue type. The stack has a data structure of first-in last-out, and the queue has a data structure of first-in first-out.

In the present disclosure, stacks for the first display 151 and the second display 250 are separately allocated and removed depending on whether they are activated.

In the open state, the second display 250 in inactive state may be switched to active state when a predetermined time has elapsed after the first display 151 is operated in active state as illustrated in (a) of FIG. 68, or when a predetermined touch input is applied to the first display 151, for example, to a specific icon as illustrated in (b) of FIG. 6B. Alternatively, although not illustrated, when a touch input is applied to the second display 250, the second display 250 may also be switched to active state.

First, referring to (a) of FIG. 6B, when the electronic device 300 is detected to be switched from the closed state to the open state while an operating current is supplied to the second display 250 according to sensing of a resistance related to the second display 250, and the first display 151 is operated in active state, a control signal to switch the second display 250 to active state may be transmitted to the second display 250. At this time, the control signal is generated by the mobile terminal 100, and transmitted to the circuit board 244 coupled with the second display 250 via the first and second wired communication units 161, 243, and the wiring portion 242.

In addition, the image signal corresponding to the screen to be outputted on the second display 250 is also transmitted to the circuit board 244 coupled with the second display 250 via the first and second wired communication units 161, 243, and the wiring portion 242, together with the control signal or sequentially after the transmission of the control signal. Here, the image signal is transmitted in DP format, converted into WI format that can be outputted on the second display 250 by the data converter 282, and provided to the second display 250.

Meanwhile, a condition of the open state for operating the first display 151 in active state and a condition of the open state for operating the second display 250 in active state may be different. For example, the open state in which the second display 250 is operated in active state may be limited to a state in which an angle between the first body 210 and the second body 220 is greater than that in the case of the first display 151.

For example, the first display 151 may be switched to active state when the electronic device 300 is detected to be in open state, and the second display 250 may be switched to active state when rear surfaces of the first and second bodies 210, 220 are relatively rotated to be closer to each other after the first display 151 is switched to active state.

Here, in the open state, the angle between the first display 151 and the second display 250 to switch the second display 250 to active state may be preset or changed by a user.

In addition, a setting of whether to switch the second display 250 to active state sequentially after the first display 151 is switched to active state may be on/off based on user input.

Next, referring to (b) of FIG. 6B, when a preset touch input (e.g., touch input applied to a predetermined icon 603 or mufti-finger touch gesture) is applied to the first display 151 while an operating current is supplied to the second display 250, an action corresponding to the touch input, that is, a control signal to switch the second display to the active state may be transmitted to the mobile terminal 100 via USB HID communication.

At this time, since the control signal is a signal related to the touch, the control signal is transmitted to the mobile terminal 100 through the first signal processor 181 and the second signal processor 281 using USB HID communication.

Figure 6C:
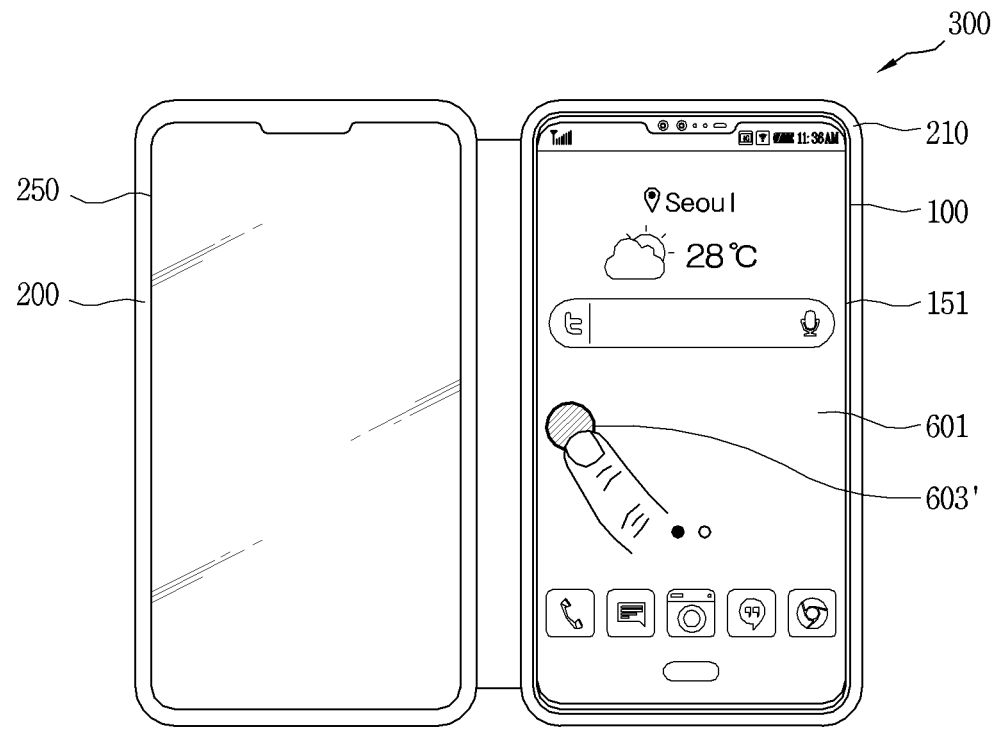

Meanwhile, referring to FIG. 6C, when a preset touch input (e.g., touch input applied to the predetermined icon 603 or multi-finger touch gesture) is again applied to the first display 151 while the second display 250 is operated in active state, the second display 250 is switched to inactive state.

To this end, a control signal corresponding to the touch signal of the preset touch input and to switch the second display 250 into inactive state is transmitted from the mobile terminal to the display 250 using USB communication. Accordingly, the second display 250 is switched back to the inactive state, and the transmission of the image signal from the mobile terminal is stopped.

Meanwhile, as another example, when a preset touch input (e.g., double tap) is applied to the second display while an operating current is supplied to the second display 250, a touch signal corresponding to the preset touch input is transmitted to the mobile terminal 100 via the circuit board 244 connected to the touch panel, the wiring portion 242 coupled with the first and second flexible printed circuit boards 247, 248, and the first and second signal processors 181, 281 using USB HID communication.

Then, the controller 180 of the mobile terminal 100 transmits a control signal to activate the second display 250 to the circuit board coupled with the second screen 251 and the second display 250 via the connector connected with the connection port of the mobile terminal, based on the transmitted touch signal. At this time, since the control signal is a signal related to the touch, the control signal is transmitted to the mobile terminal 100 through the first signal processor 181 and the second signal processor 281 using USB HID communication.

Here, the signal related to the touch is initially transmitted and received through USB 2.0 communication (hereinafter, referred to as 'first USB communication'), then transmitted and received through the switched USB HID communication (hereinafter, referred to as 'second USB communication') when the mobile terminal 100 is operated in the host mode (i.e., when resistances Ra, Rd are sensed).

In addition, the control signal is transmitted to the second display 250 through the first wired communication unit 161, the second wired communication unit 243, and the wiring unit 240 in AUX format. The control signal in the AUX format is transmitted to the second display 250 via the second data converter 282.

As described above, when the second display 250 is switched to active state, second screen information, for example, a second home screen page may be displayed on the second display 250.

To this end, the image signal corresponding to the screen to be outputted on the second display 250 is transmitted to the circuit board 244 coupled with the second display 250 via the first and second wired communication units 161, 243, and the wiring portion 242. Here, the image signal is transmitted in DP format, converted into MIPI format that can be outputted on the second display 250 by the data converter 282, and provided to the second display 250.

Meanwhile, a control signal to switch the second display 250 to active state and the image signal corresponding to the screen to be outputted on the second display 250 are transmitted through different contact pins in the first wired communication unit 161 and the second wired communication unit 243.

With respect to the first home screen page 601 being displayed on the active first display 151, referring to (b) of FIG. 6D, a sub home stack 620 for the second display 250 in addition to the main home stack 610 for the first display 151 is allocated on the memory 600.

At this time, tasks related to the DP format image signal transmitted to the circuit board 244 coupled with the second display 250 via the first wired communication unit 161, the second wired communication unit 243, and the wiring portion 242 is stacked on the sub home stack 620.

The main home stack 610 and the sub home stack 620 are independently controlled, and when a task corresponding to a specific application is executed on the second display 250, a sub-app stack 630 is additionally allocated to the memory and the task corresponding to the specific application is stacked as illustrated in (c) of FIG. 6D.

The controller 180 of the mobile terminal may transmit the DP format image signal corresponding to the task stacked on the sub-app stack 630 to the second display 250 via the circuit board 244 coupled with the second display 250 via the first wired communication unit 161, the second wired communication unit 243, and the wiring portion 242.

Here, the image signal in the DP format is converted into MIPI format by the second data converter 282 so that it can be outputted on the second display 250, and then transmitted to the second display 250. Accordingly, screen information corresponding to the task stacked on the sub-app stack 630 is displayed on the second display 250.

As described above, in the electronic device 300 according to the present disclosure, a control signal transmitted to the circuit board connected to the second display 250 and an image signal corresponding to screen information to be displayed on the second display 250 are transmitted through different contact pins.

Meanwhile, as illustrated in FIG. 6C, when the second display 250 is deactivated, the sub-stacks (e.g., sub home stack and sub-app stack) allocated on the memory are deleted from the memory.

Meanwhile, although not illustrated, when the connection port of the mobile terminal and the connector of the case are disconnected so that the wired communication path of the first wired communication unit 161 and the second wired communication unit 243 is released while the second display 250 is activated, supply of operation current is cut off, and the second display 250 is switched to inactive state.

Here, when the connection port of the mobile terminal and the connector of the case are connected again; the second display 250 is switched back to active state, and the screen information displayed on the second display 250 before the connection is cut off may be output again.

Meanwhile, the electronic device 300 according to the present disclosure may execute a game through a game application installed in a mobile terminal. Also, during the execution of a game, a virtual gamepad for playing a game application may be provided.

For example, a game screen corresponding to a game application executed in the mobile terminal may be displayed on the first display 151 (or second display 250), and a virtual gamepad for controlling the play of the game screen may be provided on the second display 250 (or first display 151).

Hereinafter, a gamepad described herein may denote a virtual gamepad interworking with a game screen to be implemented in a GUI form on either one of the first and second displays 151, 250.

Furthermore, the gamepad may include at least one of one or more virtual buttons, virtual joysticks, virtual view movements, and virtual handles.

In addition, the virtual button, the virtual joystick, the virtual view movement, the virtual handle, and the like may be displayed in the form of a plurality of images, and control through the gamepad may be performed based on a touch event for each of the plurality of images. For example, a touch event generated from the gamepad may generate a touch event on a game screen connected thereto.

To this end, each of the plurality of images may be mapped to a different touch event, and an identification region/coordinate region mapped on a game screen connected to a gamepad may be set differently.

Figure 7:
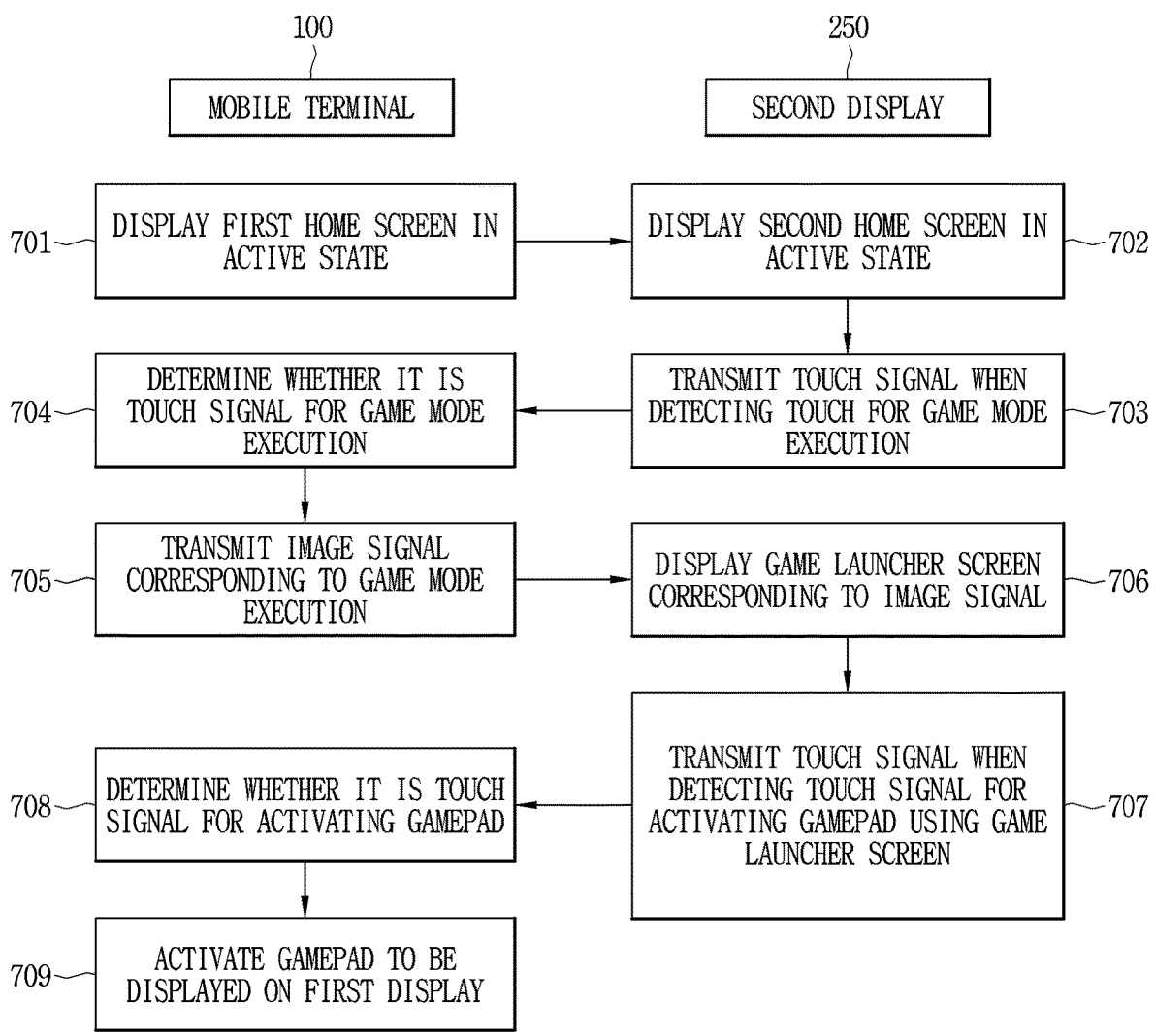
FIG. 7 is a representative flowchart for explaining a method of generating a gamepad for playing a game application in an electronic device according to the present disclosure.

Hereinafter, a method of generating a gamepad for playing a game application in an electronic device according to the present disclosure will be described in detail with reference to FIG. 7.

First, in the electronic device 300 according to the present disclosure, when a connection between the connection port of the mobile terminal and the connector of the case is detected, a wired communication path is formed by the first and second wired communication units 161, 243 according to the supply of an operating current to allow the first display 151 and the second display 250 to interwork with each other.

At this time, when the electronic device 300 is switched from the closed state to the open state, the first display 151 becomes an active state, and then the second display 250 is switched to an active state. Alternatively, the second display 250 becomes an active state based on a touch input applied to the first display 151 or the second display 250.

Initially, the first display 151 may display a first home screen page in an active state (701), and the second display 250 may display a second home screen page in an active state (702). That is, the first and second displays 151, 250 may display different home screen pages in active states.

Next, when a touch for executing a game mode is detected while the second home screen page is displayed on the second display 250, a touch signal of the detected touch is transmitted to a side of the mobile terminal 100 through the first and second wired communication units 161, 243 and the wiring portion 242 (703).

Here, the touch for executing the game mode may denote a touch applied to a specific icon to execute a game launcher or a preset touch gesture related to the execution of the game launcher.

Subsequently, when the touch signal of the detected touch is received by the mobile terminal 100, the controller of the mobile terminal determines whether the received touch signal is a touch signal for executing the game mode (704).

As a result of the determination, when the touch signal is a touch signal for executing the game mode, the controller of the mobile terminal executes the game mode, and transmits an image signal corresponding to the execution of the game launcher to the second display 250 through the first and second wired communication units 161, 243 and the wiring portion 242 (705).

At this time, when the video signal corresponding to the execution of the game launcher is a DP format signal, the image signal is converted to an MIPI format through the data converter 282.

Accordingly, a game launcher screen corresponding to the received image signal is displayed on the second display 250 (706).

Here, the game launcher screen may include a first region including icons of one or more game applications installed in the mobile terminal, and a second region including one or more game-related too menus.

The gamepad according to the present disclosure may be generated based on a touch input applied to either one of the first region and the second region.

Specifically, when a touch for activating the gamepad is detected using the game launcher screen displayed on the second display 250, the touch signal of the detected touch is again transmitted to the mobile terminal 100 through the first and second wired communication units 161, 243 and the wiring portion 242 (707).

Then, the controller of the mobile terminal determines whether the received touch signal corresponds to a touch signal for generating a gamepad (708), and activates and display the gamepad on the display 151 when the received touch signal is a touch signal for activating the gamepad (709).

That is, the gamepad is generated in a display region other than the display region in which the game launcher screen is displayed.

In the above example, since the game launcher screen is displayed on the second display 250, the gamepad interworking therewith is displayed on the first display 151. Accordingly, when the game launcher screen is displayed on the first display 151, the gamepad interworking therewith will be displayed on the second display 250.

Hereinafter, each process of FIG. 7 will be described by way of specific examples with reference to FIGS. 8A to 8E.

Figure 8A:
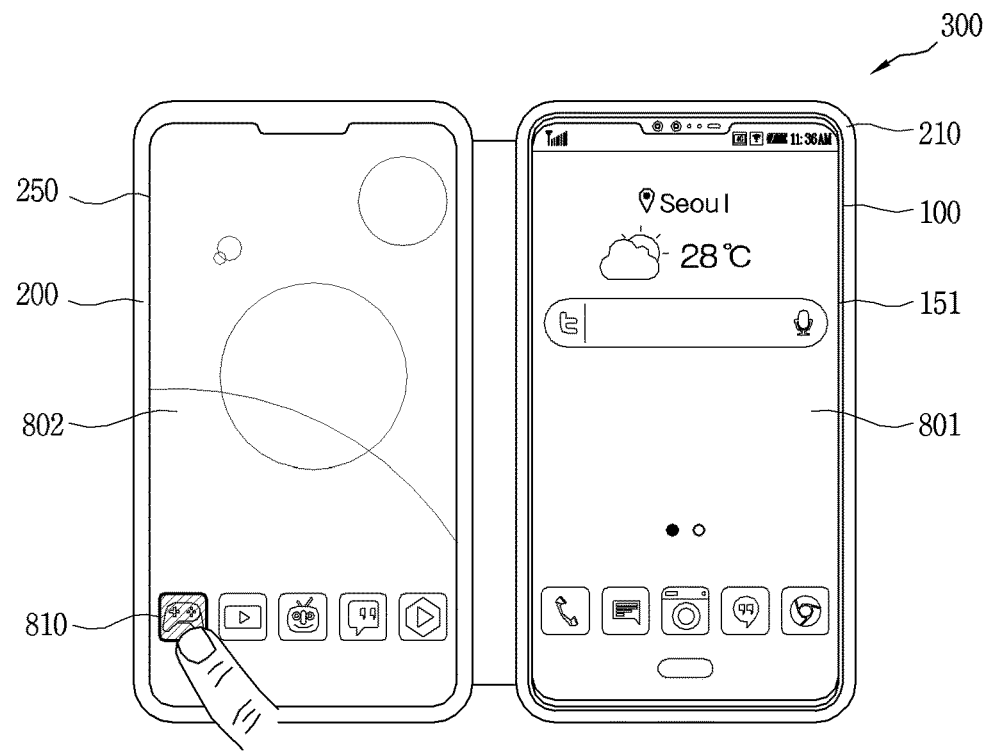
FIGS. 8A to 8E are conceptual views for specifically explaining a process of the flowchart in FIG. 7.

First, referring to FIG. 8A, when both the first and second displays 151, 250 are in active states in the electronic device 300, a first home screen page 801 may be outputted to the first display 151, and a second home screen page 802 may be output to the second display 250.

In this state, the controller of the mobile terminal 100 may detect an entry into an operation mode for executing a game application installed in the mobile terminal based on a touch input applied to a game launcher execution icon 810 on the second home screen page 802 displayed on the second display 250 as shown in FIG. 8A.

On the other hand, although not shown, the game launcher execution icon is also included in the first home screen page 801 displayed on the first display 151, and an entry into an operation mode for executing the game application may also be performed based on a touch input applied to the first home screen page 801.

Figure 8B:
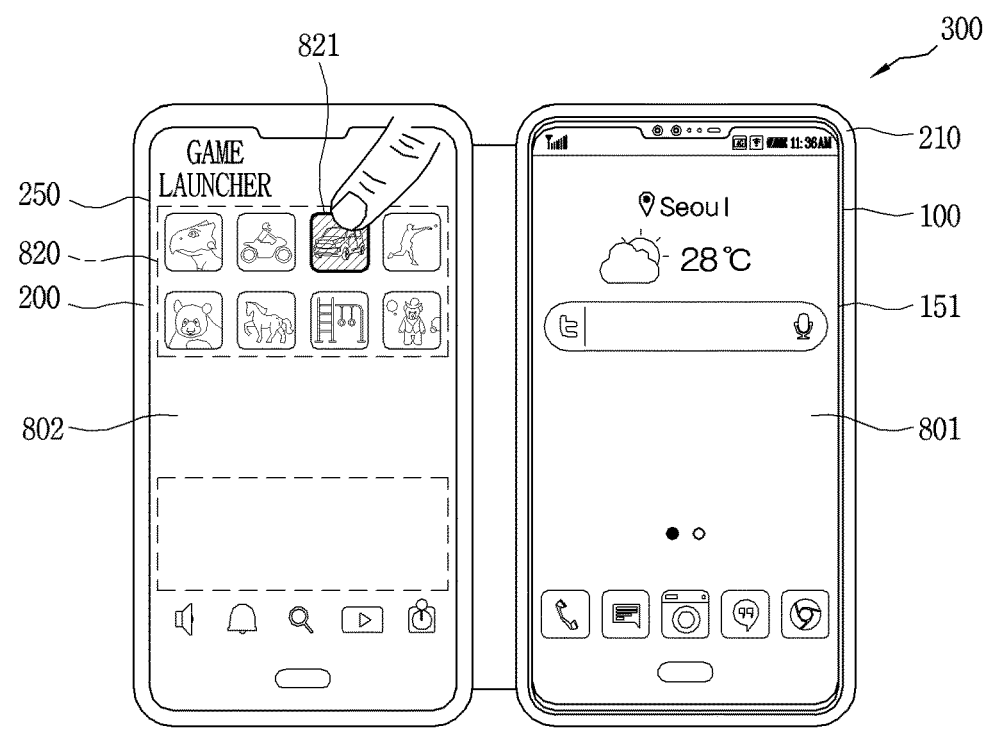

When the operation mode for executing the game application is performed in this manner, as illustrated in FIG. 8B, a game launcher screen is displayed on the second display 250.

A list region 820 including one or more game icons is displayed on the game launcher screen. In this state, when a touch input is applied to a specific game icon 821 in the list region 820, a specific game application corresponding to the game icon 821 to which the touch input is applied is executed to display a game screen 803 corresponding to the second display 250 as shown in FIG. 8C.

To this end, the controller of the mobile terminal 100 receives a touch signal of a touch input applied to the game icon 821 displayed on the second display 250 to determine and execute a corresponding game application. Then, an image signal corresponding to a screen of the executed game application is transmitted to the second display 250 through the first and second wired communication units 161, 243 and the wiring portion 242.

Figure 8C:
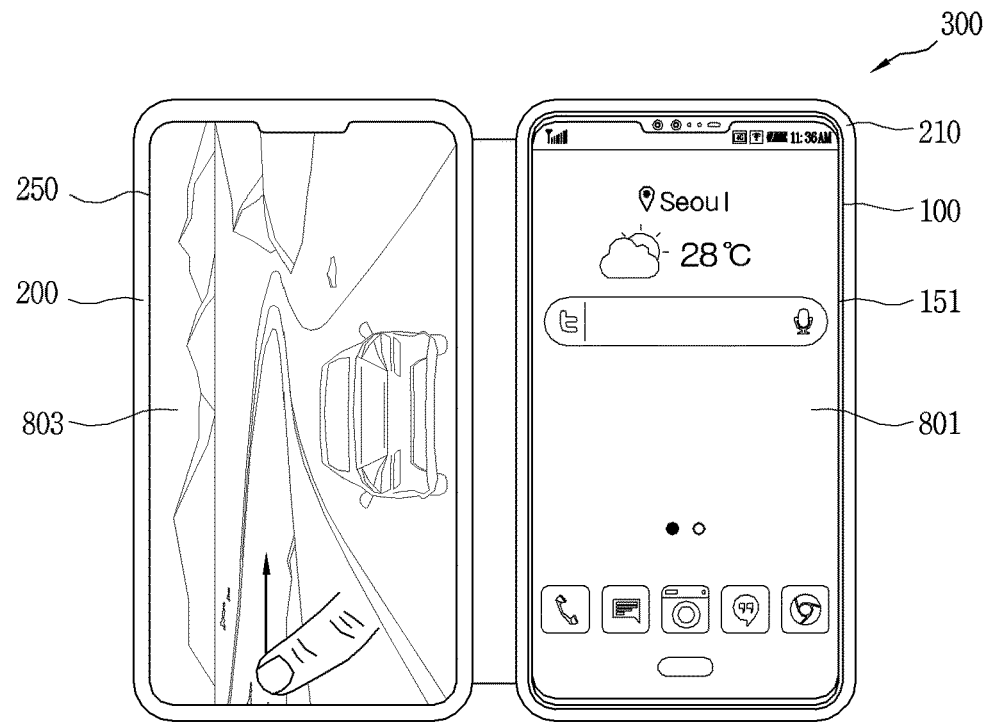
Figure 8D:
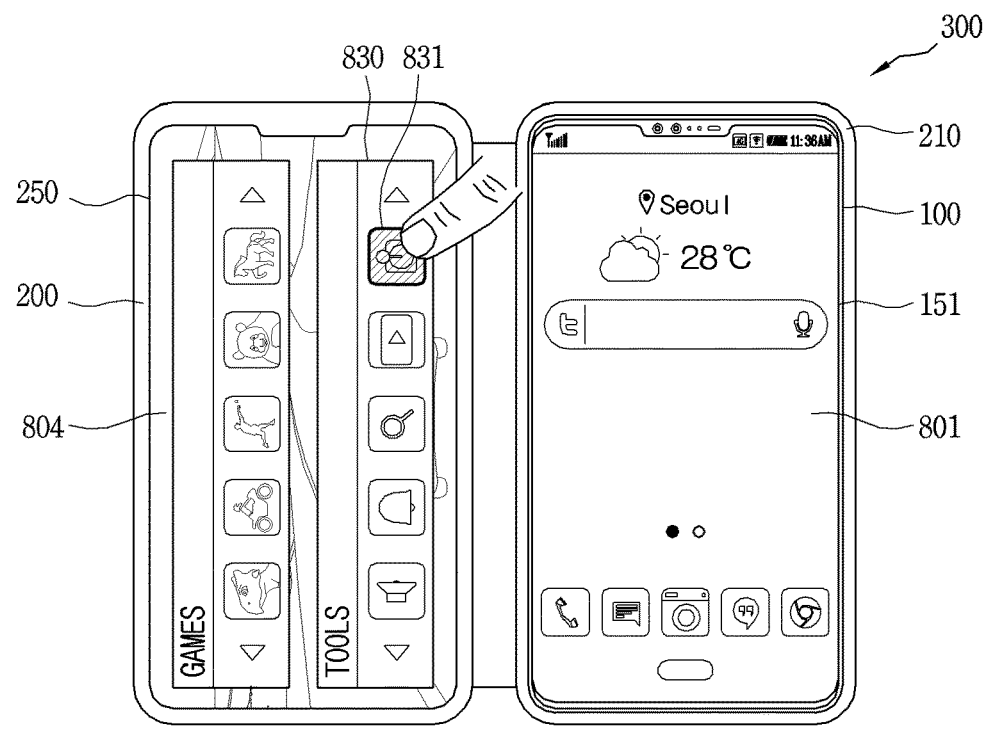

Meanwhile, as shown in FIG. 8C, the game screen 803 is displayed in a landscape mode even when there is no display direction of the electronic device 300. Accordingly, the first home screen page 801 displayed on the first display 151 maintains a display in a portrait mode, and the second display 250 is changed from a portrait mode display to a landscape mode display when displaying the game screen.

A control signal corresponding to such a change of display direction is transmitted through the controller of the mobile terminal 100 or the controller of the second display 250.

When a preset touch gesture (e.g., a flicking/dragging touch gesture applied to a side boundary of the screen) is applied to the second display 250 while the game screen 803 is displayed in a landscape mode display as described above, as illustrated in FIG. 8D, a menu screen 804 is shown in an overlapping manner on the game screen 803.

At this time, the menu screen 804 may gradually appear along a flicking/dragging direction of the preset touch gesture applied to the second display 250.

The menu screen 804 may include a first region including a list of executable games and a second region 830 including a tool menu related to a game, and an icon 831 for activating a gamepad may be included in the second region 830.

Figure 8E:
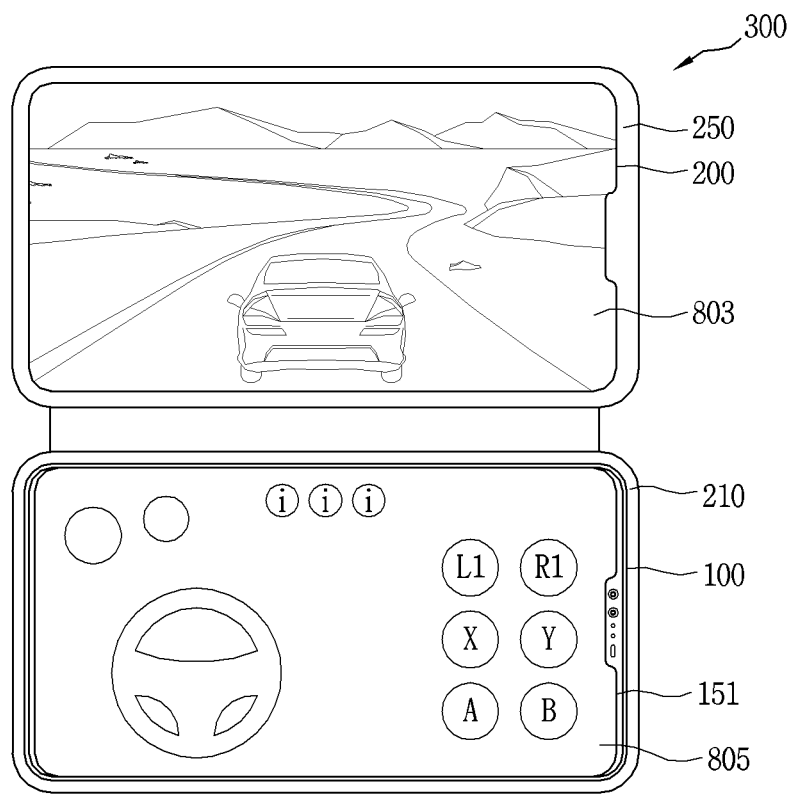

When a touch input is applied to the icon 831 for activating a gamepad on the menu screen 804, the gamepad is activated and displayed in another display region, that is, on the first display 151. Accordingly, as illustrated in FIG. 8E, the game screen 803 currently being executed is displayed on the second display 250, and the activated gamepad 805 is displayed on the first display 151.

Meanwhile, the type of the gamepad 805 displayed on the first display 151 is determined according to the category of a game application corresponding to the game screen 803 displayed on the second display 250. For example, as shown in FIGS. 8C and 8E, when the category of the game being executed is racing, the gamepad displayed on the second display 250 is also determined as a racing type gamepad including a virtual steering wheel, a virtual instrument panel, and the like according to the racing type game.

As such, the category of the installed game application and the type of a gamepad matching each category (e.g., Console, Racing, Arcade, Basic) may be stored in advance, for example, in the form of a table in the memory 170 of the mobile terminal to determine the type of the gamepad suitable for each category of the game application. Furthermore, a dedicated gamepad (e.g., Battle Ground, Lineage, eta) for a specific game may be stored in a one-to-one matching relationship with a specific game application.

As described above, as a game screen being executed is displayed on the second display 250 and a gamepad for the play (control) of the game screen is displayed on the first display 151, the controller of the mobile terminal 100 may process a touch input to the gamepad by performing a touch event on the game screen interworking therewith.

Thus, the user may control a game screen with a larger screen using a conventional touch input method without covering the game screen. In addition, mechanical elements such as a virtual joystick, a virtual handle, and the like are implemented to provide a game execution environment with a higher sense of realism.

Meanwhile, in the case of the gamepad described above, a touch event generated from the gamepad is applied not only to a screen of the gamepad, but also to another display on which the screen of the game being played is displayed.

In a state where different screens related to one or two displays are displayed, the present disclosure may be applicable to all cases in which a touch event generated from one screen is transmitted to another screen.

Therefore, as described above, the present disclosure may be applicable to a case where a mobile terminal is mounted in a case having a display to be driven as a single electronic device, as well as a case where different screens are displayed in a plurality of regions of a single display, and a case where two displays at two positions spaced apart from each other are connected in a wireless or wired manner to interwork with each other.

In the present disclosure, a "touch event" may include all of various types of touch inputs. For example, the touch event may include all of a short touch, a double touch, a long touch, a touch and drag, a flicking touch, a swipe touch, a pinch in/out touch, a multi-finger touch, a hover touch, and the like.

In addition, the "touch event" includes a key event for generating a specific key value in addition to a touch event, a motion event for generating a touch signal value with respect to a touch point.

Meanwhile, although embodiments in which a "touch event" generated from a gamepad is applied to a game screen are described below, it is noted in advance that the present disclosure is not limited thereto. Accordingly, it may be applicable to various types of applications in which any one screen is controlled by a touch event applied to another screen interworking therewith.

As described above, the gamepad may include at least one of one or more virtual buttons, virtual joysticks, virtual view movements, and virtual handles. In addition, a touch event generated from the gamepad may generate a touch event for a game screen connected thereto.

Hereinafter, the conversion of a touch event will be described using a case where the gamepad is displayed on the first display 151 of the mobile terminal and a game screen is displayed on the second display 250 of the case, as an example.

However, the present disclosure is not limited thereto, and may also be similarly applicable to a case where a game screen is displayed on the first display 151 and a gamepad is displayed on the second display 250.

Furthermore, the first and second displays 151, 250 may be replaced with virtual regions divided in a single display module, or replaced with displays of different devices that communicate in a wireless manner at positions spaced apart from each other.

In addition, in the present disclosure, it has been described on the premise that a gamepad is displayed on the first display 151 provided in the mobile terminal, and an execution screen, that is, a 'game screen', of a game application is displayed on the second display 250 provided at a side of the case 200.

However, embodiments described below may, of course, also be similarly applicable to a case where a game screen is displayed on the first display 151 and a gamepad is displayed on the second display 250.

The gamepad displayed on the second display 250 may include one or more virtual keys, virtual buttons, virtual handles, virtual joysticks, and the like (hereinafter, 'virtual keys, etc.'), and when a touch event is applied to one or more of them, signal values corresponding to individual touch events are transmitted to the mobile terminal 100 through the first and second wired communication units 161, 243 and the wiring portion 242.

Then, the controller of the mobile terminal 100 transmits the received signal value to a game application as well as a gamepad application. Accordingly, a touch event generated from the gamepad may be processed as being generated from the game screen as well as from the gamepad. That is, when a touch is applied to the gamepad, a corresponding touch signal may be generated on both the gamepad and the game screen.

To this end, regions respectively mapped to various keys of the gamepad displayed on the second display 250 may exist on the game screen displayed on the first display 151.

In addition, the positions and sizes of the respectively mapped regions may vary according to the type of the game screen and the type of the gamepad. Accordingly, a touch position corresponding to a touch event generated from the gamepad and a touch position corresponding to a touch signal transmitted to the game screen may be different from each other.

In the present disclosure, it has been implemented that when a touch event generated from the gamepad is transmitted as it is to the game screen, which is another screen related thereto, as well as when a touch event generated from the gamepad is processed or converted to improve usability, the processed or converted touch event is also transmitted to the game screen.

In addition, a "graphic object" on a virtual pad used in the present disclosure is defined to denote every virtual key, virtual button, virtual handle, virtual joystick, and other virtual operation units implemented on the virtual pad, regardless of various types of virtual pads, that is, a 'virtual key or the like'.

Accordingly, a boundary of a graphic object denotes a boundary of the aforementioned virtual key or the like, and a touch input outside the boundary of the graphic object denotes a touch input on the gamepad outside the boundary of the virtual key or the like.

Hereinafter, a method of converting a touch event, for example, a joystick event, performed on a gamepad displayed on the first display 151 in the electronic device 300 according to the present disclosure will be described with reference to FIGS. 9A to 9C.

Figure 9A:
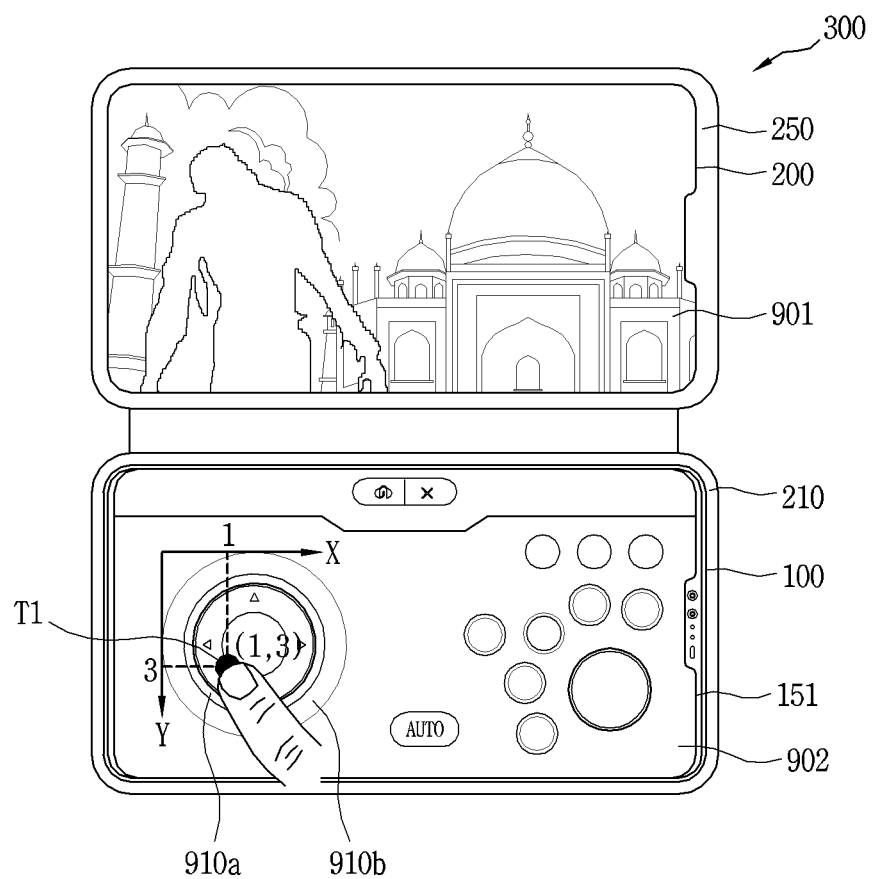
FIGS. 9A to 9C are conceptual views related to a method of converting a joystick event of a touch event performed on a gamepad in an electronic device according to the present disclosure.

First, referring to FIG. 9A, there is shown a case where a short touch is applied to a point T1 inside a boundary 910a of a virtual joystick in a gamepad 902 displayed on the first display 151. In this case, a pair of XX coordinates, for example, (1, 3), becomes a touch point.

When a short touch is applied to an inside of the boundary 910a of the virtual joystick as described above, a touch event therefor is generated and transmitted to a game application corresponding to a game screen displayed on the second display 250.

Then, a screen change corresponding to the converted touch input received and processed by the game application is displayed on a game screen 901 of the second display 250.

Meanwhile, in some cases, even when the short touch is applied to a region within a predetermined distance outside the boundary 910a of the virtual joystick, it may be processed as a touch input performed on the virtual joystick. That is, the pair of X,Y coordinates may be converted into a touch input of a pair of coordinates corresponding to the boundary 910a of the virtual joystick, and may be transmitted to the gamepad application (or joystick application) and the game application.

In this way, a region 910b that is out of the boundary 910a of the virtual joystick but processed as an effective touch to the virtual joystick will be referred to as an "extended touch effective region".

Subsequently, a case where a touch is moved from an initial touch point T2 to the virtual joystick on the gamepad 902 will be described with reference to FIG. 9B. In this case, when the controller of the mobile terminal 100 performs coordinate conversion based on the initial touch point T2 when determining whether a touch point T3 that has been moved is a touch event for the virtual joystick.

For the movement of the effective touch on the virtual joystick, a threshold distance (max distance) may be set to be short to quickly perform a touch response in consideration of an operational characteristic (i.e., instantaneous operation) of the virtual joystick as a hardware device.

For example, the threshold distance may be set to about 1 cm or less regardless of a size of the graphic object, that is, the virtual joystick (i.e., even when a size of the virtual joystick is large).

Furthermore, the touch event corresponding to the virtual joystick is not converted into a pair of X, Y coordinates, but converted into a movement distance and an angle (distance, radians (angle)) corresponding to 360 degrees coordinates centered on the initial touch point T2, and provided for the joystick application and the game application.

Figure 9B:
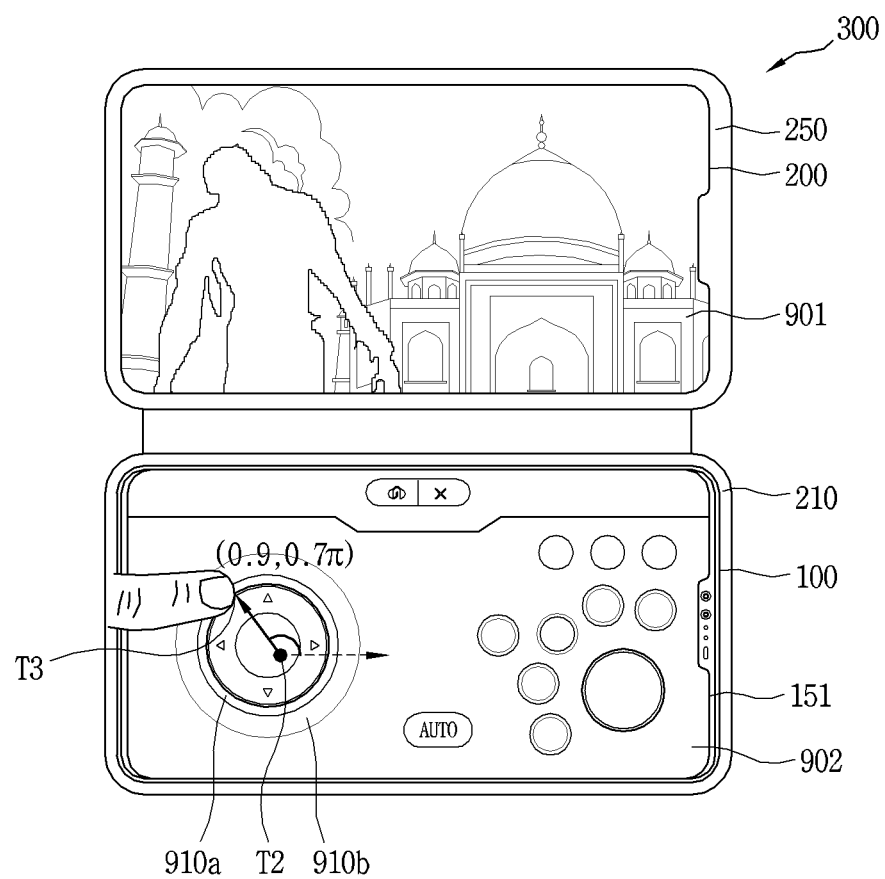

In FIG. 9B, it can be seen that the 360-converted coordinates of the moved touch point T3 based on the initial touch point T2 are calculated as (0.9, 0.7π).

Figure 9C:
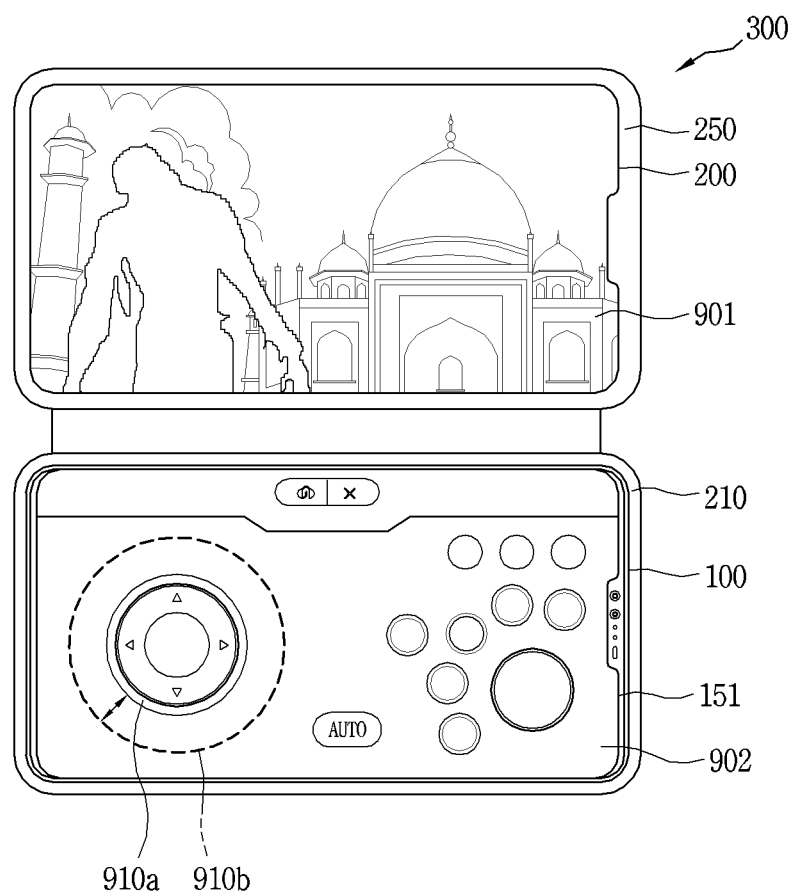

Subsequently, FIG. 9C illustrates the boundary 910a of the virtual joystick on the gamepad 902 and the extended touch effective region 910b beyond the boundary 910a In this case, even when the initial touch point T2 described in FIG. 9B is located within the extended touch effective region 910b beyond the boundary 910a of the virtual joystick, it is processed as a touch input to the virtual joystick.

A condition for a touch input generated from the virtual joystick on the gamepad, hereinafter, a "first touch event" to be coordinate-converted and transmitted to the gamepad application and the game application may be one of the following three cases:

1) a case where a touch position corresponding to the first touch event is located inside a boundary of the virtual joystick;

2) a case where a touch position corresponding to the first touch event moves within a first threshold distance based on an initial touch point; and 3) a case where a touch position corresponding to the first touch event moves out of a boundary of the virtual joystick and within a second threshold distance.

Here, the first threshold distance denotes a value determined by using the initial touch point corresponding to the first touch event as a central axis of a circle, and for example, may be determined to be about 1 cm according to the aforementioned joystick operational characteristics.

Here, the second threshold distance denotes a value determined based on the boundary of the virtual joystick.

Specifically, the second threshold distance denotes a value obtained by subtracting a distance from a central point of the virtual joystick to the boundary value from the first threshold distance, that is, (first threshold distance–radius of virtual joystick). The second threshold distance may also denote a distance from a boundary of the virtual joystick to an outer boundary of the extended touch effective region shown in FIG. 9C.

As such, the coordinate-converted touch event is generated based on a touch position of the first touch event. Here, a touch event that is coordinate-converted based on the first touch event will be referred below to as a "second touch event".

That is, a touch event prior to coordinate conversion will be referred to as a "first touch event", and a touch event that is coordinate-converted for the first touch event will be referred to as a "second touch event".

The second touch event has a coordinate value converted to be processed as an input to the virtual joystick. Furthermore, the second touch event is transmitted not only to a gamepad application, for example, a virtual joystick application, but also to a game application executed on another screen.

Specifically, the controller of the mobile terminal 100 may control the second touch event instead of the first touch event to be transmitted to the game application being executed on the second display 250 in response to the first touch event generated from the gamepad displayed on the first display 151 being converted into the second touch event.

In addition, when a first touch event is initiated by the virtual joystick on the gamepad, the controller of the mobile terminal 100 may ignore the boundary of the virtual joystick, that is, without being limited to the boundary, and perform coordinate conversion for successive touch points using the position of an initial touch point of the first touch event as a central axis of a circle.

In this case, a second touch event that has been coordinate-converted for successive touch points may be provided to the game application as described above.

Furthermore, in case where the first touch event is initiated outside a virtual button of the gamepad, when it is determined that an initial touch point of the first touch event is located within a predetermined distance from a boundary of the virtual button, that is, within an extended touch effective region, the controller of the mobile terminal 100 may generate the second touch event by converting the coordinates of the first touch event to be generated within a boundary of the corresponding virtual button.

Hereinafter, each process of a touch event conversion method performed by a gamepad in an electronic device according to the present disclosure will be described in detail with reference to FIG. 10.

Figure 10:
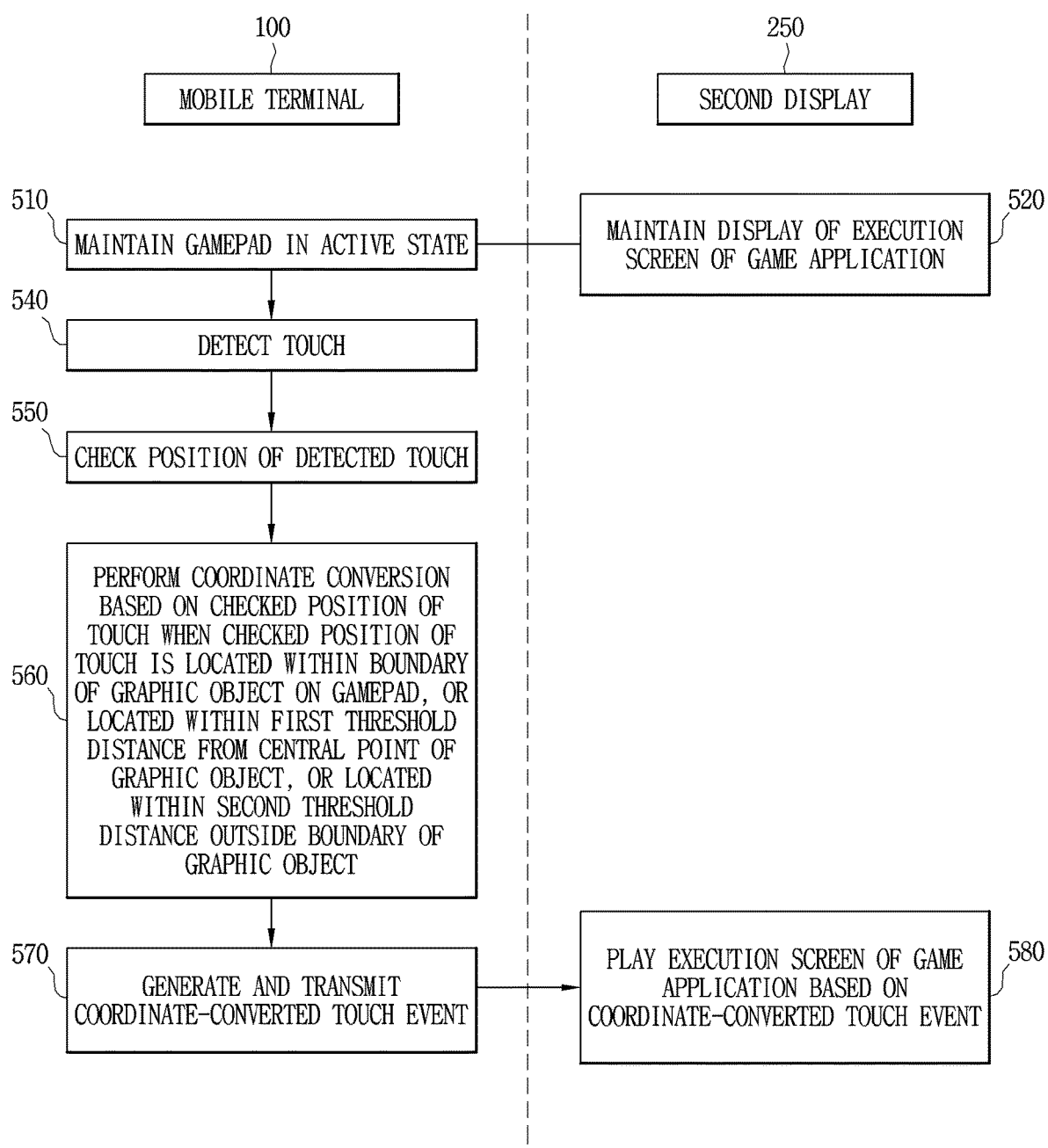
FIG. 10 is a flowchart for explaining a method of converting a touch event performed on a gamepad in an electronic device according to the present disclosure.

Referring to FIG. 10, first, in the electronic device 300, a gamepad maintains an active state on the first display at a side of the mobile terminal 100 (510), and an execution screen, that is, a game screen, of a game application maintains a display state on the second display 250 at a side of the case 200 (520).

Meanwhile, as described above, the gamepad may be displayed on the second display 250, and the game screen may be displayed on the first display 151.

Subsequently, a touch applied to the gamepad is detected (540), and the position of the sensed touch is checked by the controller of the mobile terminal 100 (550).

When the checked position of the touch is located within a boundary of the graphic object (e.g., virtual joystick) on the gamepad, or located within a first threshold distance from the central point (the central point of the virtual joystick or the initial touch point), or located within a second threshold distance outside the boundary of the graphic object, the mobile terminal 100 performs coordinate conversion based on the checked position of the touch (560).

At this time, the controller of the mobile terminal may apply a different method of coordinate conversion according to the type of the virtual key in which the checked position of the touch exists on the gamepad.

For example, in the case of a virtual joystick, it may be coordinate-converted into a 360 degrees converted joystick event, and in the case of a virtual key, it may be coordinate-converted into a key event corresponding to a specific key value.

Next, the controller of the mobile terminal generates a coordinate-converted touch event, that is, a second touch event, and transmits it to the game screen interworking therewith, that is, the second display 250 (570).

Specifically, the controller of the mobile terminal applies the second touch event to the gamepad application while at the same time transmitting the second touch event to a manager of the game application being executed on the second display 250.

Then, the controller of the mobile terminal controls a screen change corresponding to the touch event received by the manager of the game application to be mapped onto the second display 250.

To this end, the controller of the mobile terminal 100 may include a converter (or conversion unit) performing a function of receiving a first touch event that satisfies a preset condition from the first display 151 on which the gamepad is displayed, converting the received first touch event to generate the second touch event, and providing the generated second touch event to the game application or the game application and the gamepad application.

Figure 11:
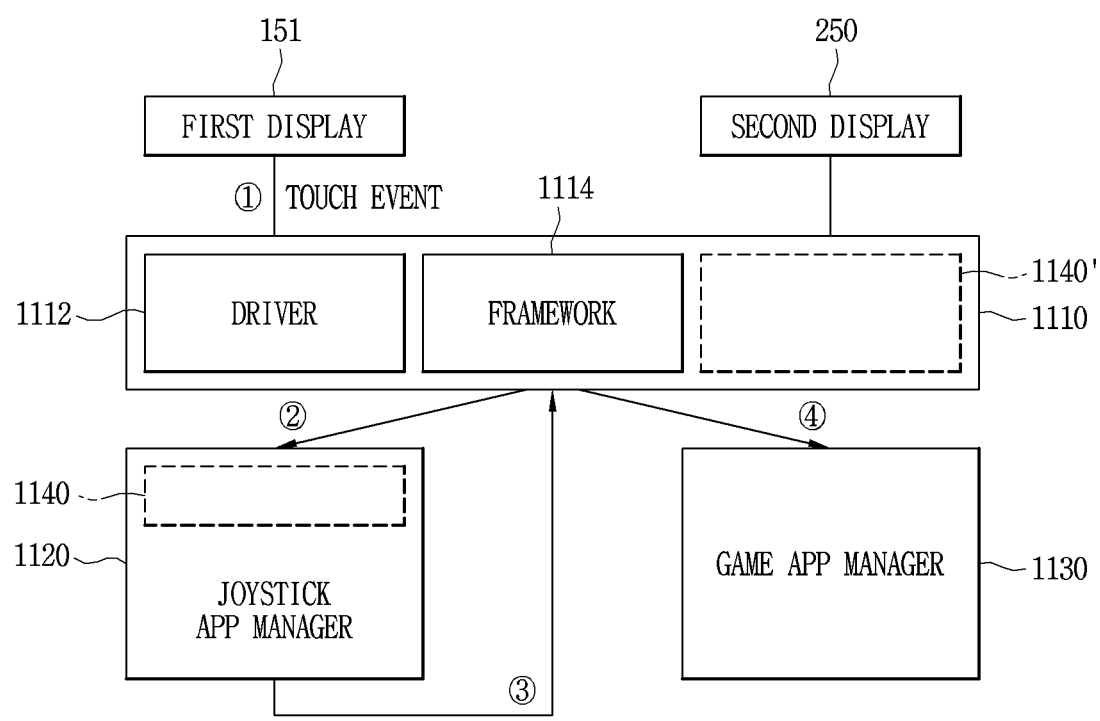
FIG. 11 is a view showing a software structure for converting a touch event generated from one screen through a converter and transmitting the converted touch event to an app manager of another screen in an electronic device according to the present disclosure.

In this regard, FIG. 11 shows a diagram in which when a first touch event is generated with respect to the virtual joystick of the gamepad, a coordinate-converted second touch event is transmitted to a manager of the game application executed on the second display 250. That is, a software structure related to the present disclosure is shown.

Specifically, in FIG. 11, when a first touch event is generated from the first display 151 of the electronic device 300 (①), the controller of the mobile terminal transmits the first touch event to the gamepad application, for example, a joystick application manager 1120, through a framework 1114, which is an upper layer of a software module 1110, via a driver 1112 existing at a lower layer thereof, for example, a kernel layer (②).

Here, a converter 1140 existing in the joystick application manager 1120 converts the coordinates of the first touch event to generate a second touch event.

Accordingly, the joystick application manager 1120 recognizes the generated second touch event.

Then, the generated second touch event is transmitted to the framework 1114 (③), and then transmitted to a game application manager 1130 executed on another screen (④).

Here, the converter 1140 denotes a software configuration, which may be an application program that performs a function of receiving a touch event, converting the received touch event, and transmitting the converted touch event. However, the present disclosure is not limited thereto, and may also be implemented as a hardware component.

Meanwhile, for another example, a converter 1140' may be located in the framework 1114 (not shown) or at an upper layer thereof.

In this case, the touch event coordinate-converted by the converter 1140' may be transmitted to the joystick application manager 1120 and the game application manager 1130, respectively.

Referring back to FIG. 10, when the coordinate-converted second touch event is transmitted to the second display 250, an execution screen of the game application based on the second touch event is displayed on the second display 250 (580).

Specifically, the controller of the mobile terminal 100 transmits the coordinate-converted second touch event to the manager of the game application driven by the mobile terminal, and provides control and image signals based thereon to the second display 250 through the first and second wired communication units 161, 243 and the wiring portion 242. Then, the second display 250 displays a screen based on the received control and image signals.

As described above, in the present disclosure, the touch position of a touch event generated on the gamepad is not directly transmitted to the game screen, but is transmitted to the manager of the game application corresponding to the game screen, and then screen conversion or operation mapped thereto is applied to the game screen.

Accordingly, usability is improved even when the game screen and the gamepad are independently activated on different screens (being output to a plurality of different displays or separate regions on a single display).

Hereinafter, another method of converting a touch event performed on a gamepad in an electronic device according to the present disclosure will be described with reference to FIG. 12.

Figure 12:
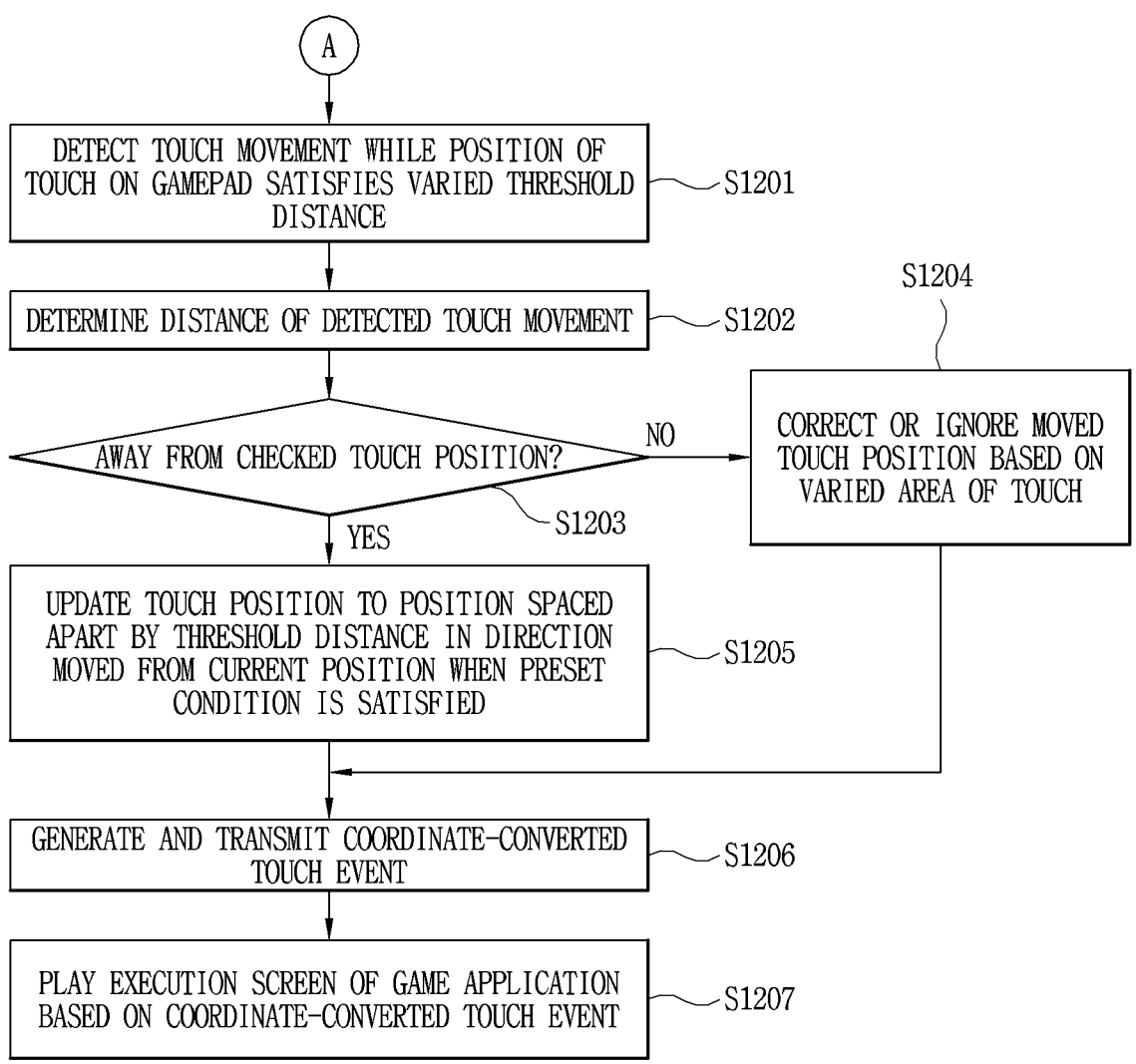
FIG. 12 is a flowchart for explaining another method of converting a touch event performed on a gamepad in an electronic device according to the present disclosure.

Referring to FIG. 12, it is disclosed on the premise of the process 550 of checking the position of a touch applied to the gamepad while the gamepad and the game screen are displayed on the first and second displays 151 and 250, respectively, in FIG. 10.

As a result of the check, a touch movement is detected in a state where the position of a touch on the gamepad satisfies a varied threshold distance (S1201).

Next, a distance of the detected touch movement is recognized (S1202) to determine whether or not it moves away from the checked touch position (S1203). Here, the distance of the detected touch movement may be calculated by the following equation.

Distance=(checked coordinate point of touch position~current coordinate point of touch position)/first threshold distance or second threshold distance(distance max)

When the distance of the sensed touch movement is away from the checked touch position by more than a reference distance, and a preset condition is satisfied, the touch position is updated to a position spaced apart by a threshold distance from the current position (S1205). That is, coordinates are updated for the first touch event. This is distinguished from the second touch event that has been coordinate-converted based on the first touch event.

A specific process of updating the coordinates is as follows.

Specifically, the controller of the mobile terminal 100 may detect that the first touch event is initiated by a virtual button of the gamepad, and a movement of a touch from an initial touch point corresponding to the first touch event is changed from a first direction to a second direction opposite to the first direction.

Then, the controller of the mobile terminal 100 compares areas of the initial touch point and a current touch point, updates the coordinates of the current touch point based on a result of the comparison, and converts the touch point based on the updated coordinates to generate the second touch event.

As a specific example, the controller of the mobile terminal 100 may update the position of the touch point to a position separated by the first threshold distance in a direction opposite to a movement direction from a current position (for example, a down direction when has been moved in an up direction, and a right direction when has been moved in a left direction).

For example, when down coordinate values to be updated are (x, y) and coordinate values of a current touch point is (x1, y1), the updated coordinate values may be calculated through the following equation.

$x = x1 + \text{first threshold distance}(a) * \cos(\tan^{-1}(y/x))$, $y = y1 + \text{first threshold distance}(a) * \sin(\tan^{-1}(y/x))$ Next, the controller of the mobile terminal generates a second touch event coordinate-converted based on a touch event having the updated coordinates (hereinafter, distinguished as a 'modified second touch event') to transmit the second touch event to the second display 250 on which a game screen is displayed (S1206). Here, the modified second touch event may be a specific key value or a motion event.

Then, the second display 250 plays an execution screen, that is, a game screen, of the game application based on the modified second touch event (S1207).

Meanwhile, in the above process S1203, unless the distance of the sensed touch movement is away from the checked touch position, the touch position may be corrected based on a varied touch area.

Specifically, when an external maximum value (touch major) of the touch point and/or an internal maximum value (touch minor), and/or a touch area (touch size) of the touch point increases by more than a specific value, the y-coordinate may be selectively updated as follows.

$$Y=Y+((\text{specific value}*\text{touch minor})(\text{specific value}*\text{touch minor})(\text{specific value}*\text{touch size})$$

Figure 13A:
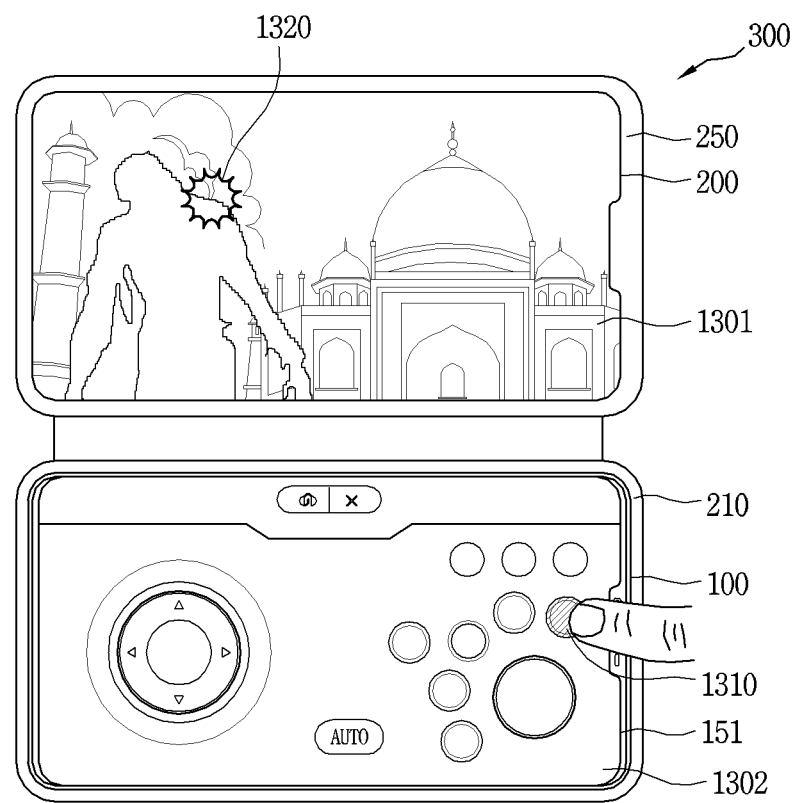
FIG. 13A is a view showing processing on a game screen when applied within a specific virtual button of a gamepad.
Figure 13B:
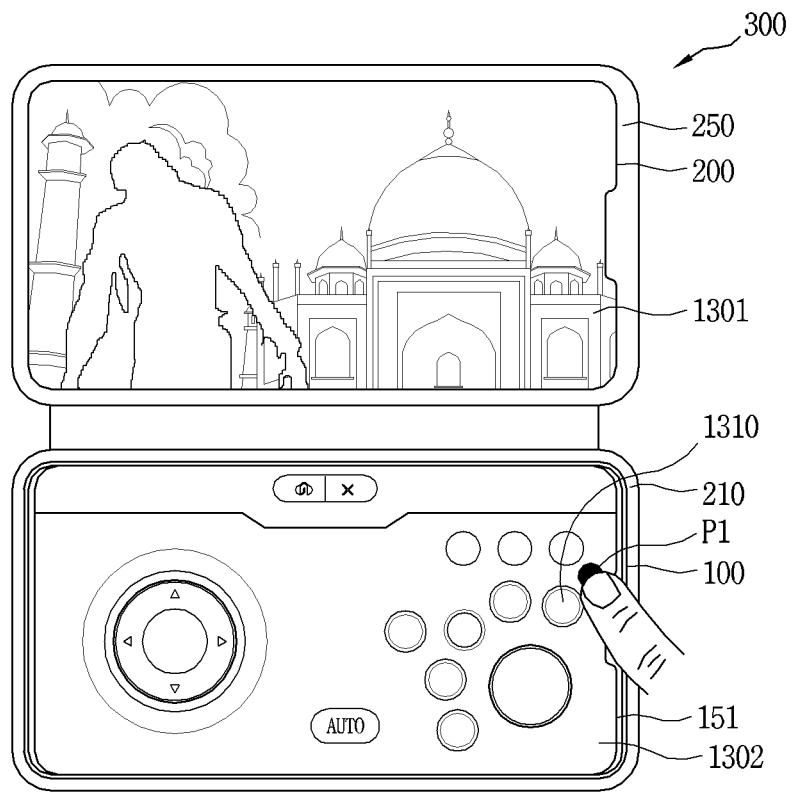
FIG. 13B is a view showing an example of a touch applied outside of a specific virtual button on the gamepad in an electronic device according to the present disclosure.

FIG. 13A is a view showing processing on a game screen when applied within a specific virtual button of a gamepad, and FIG. 13B is a view showing an example of a touch applied outside of a specific virtual button on the gamepad in an electronic device according to the present disclosure.

Hereinafter, different processing methods for a touch applied outside of a specific virtual button on the gamepad in connection with FIG. 13B will be described with reference to FIGS. 14A and 14B.

First, referring to FIG. 13A, in the electronic device 300 according to the present disclosure, when a touch event is generated as a touch input is applied to a specific virtual key 1310 of a gamepad 1302 displayed on the first display 151, the touch event is applied to a gamepad application and processed such that the corresponding virtual key 1310 has been selected.

Furthermore, the touch event is transmitted to the game application executed on the second display 250, and the corresponding control and image signals are finally transmitted to the second display 250 through the first and second wired communication units 161, 243 and the wiring portion 242.

Accordingly, a corresponding screen change, for example, a selection display, on the second display 250 is displayed at a specific icon/point 1320.

Meanwhile, as shown in FIG. 13B, when a touch input is not performed within the specific virtual key 1310 of the gamepad 1302, a corresponding touch input may be ignored so as not to generate a touch event. In this case, since the touch event will not be transmitted to the game application, the screen change as shown in FIG. 13A will not be output to the game screen 1301 displayed on the second display 250.

As such, when the first touch event is initiated outside the virtual button of the gamepad and a plurality of virtual buttons exist in a region adjacent to an initial touch point corresponding to the first touch event, the controller of the mobile terminal 100 updates the coordinates of a touch point for the selected virtual button according to a preset condition, and converts the touch point based on the updated coordinates to generate the second touch event.

Furthermore, as described above, the generated second touch event is transmitted to both the gamepad application and the game application.

According to a first embodiment, the selection of the virtual button according to the preset condition may be made based on a touch point touched up immediately before the selection.

Specifically, when a touch-down event is generated from a first virtual button of the gamepad and a touch-up event is generated while out of the first virtual button, and then a touch-down event is generated again within an effective region of the touch point corresponding to the touch-up event within a predetermined period of time, the controller of the mobile terminal 100 may determine the first virtual button as a virtual button selected according to the preset condition.

Here, the predetermined period of time may be within one second. In addition, the effective region of the touch point corresponding to the touch-up event denotes a predetermined distance from the touch point where the touch-up event is generated, which may be narrowly set to the above-mentioned extended touch effective region.

According to a second embodiment, the selection of a virtual button according to the preset condition may be performed based on a center distance and/or an effective touch area for a plurality of adjacent virtual keys.

First, a case where a specific virtual button is selected based on a position of a touch point and a center distance for a plurality of virtual keys will be described.

Figure 14A:
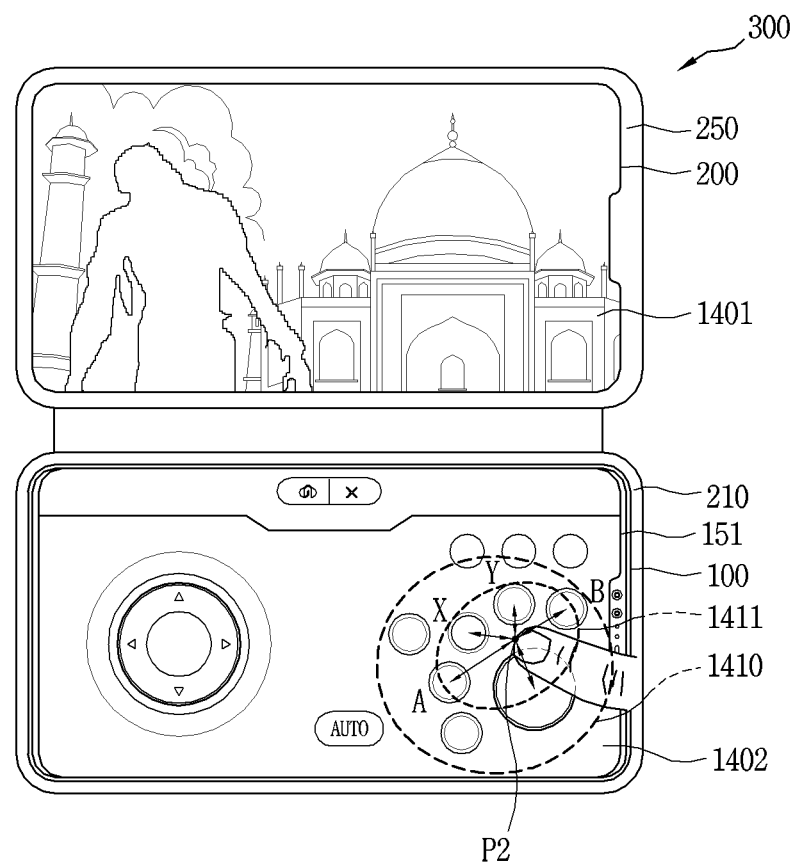
FIGS. 14A and 14B are exemplary views for explaining different processing methods for a touch applied outside of a specific virtual button on the gamepad in connection with FIG. 13B.

In this regard, referring to FIG. 14A, when a touch point P2 of a touch input applied to a virtual pad 1402 is not located inside any virtual key, but a plurality of virtual keys 1410 are located adjacent thereto, a virtual key whose distance 1411 from each center point or from each boundary of the plurality of virtual keys 1410 to the touch point P2 is the closest (i.e., the smallest value) may be selected. Accordingly, a key event corresponding to the selected virtual key is generated. Furthermore, the key event is also transmitted to a game application corresponding to a game screen displayed on the second display 250.

A formula for calculating a distance from each center point of the plurality of virtual keys 1410 to the touch point P2 is, for example, as follows.

$$((x-x_c)^2+(y-y_c)^2)^{1/2}-L$$

Here, (x, y) is the touch point P2, ($x_c$, $y_c$) is a center point of each virtual key, and L is a distance between a boundary and the center point of each virtual key.

In addition, in one example, when a virtual key does not exist adjacent to the touch point P2 or is recognized as an edge of the virtual pad 1402, such a touch may be ignored.

Next, a case where a specific virtual button is selected based on a position of the touch point and an area of the extended touch effective region for a plurality of virtual keys will be described.

Figure 14B:
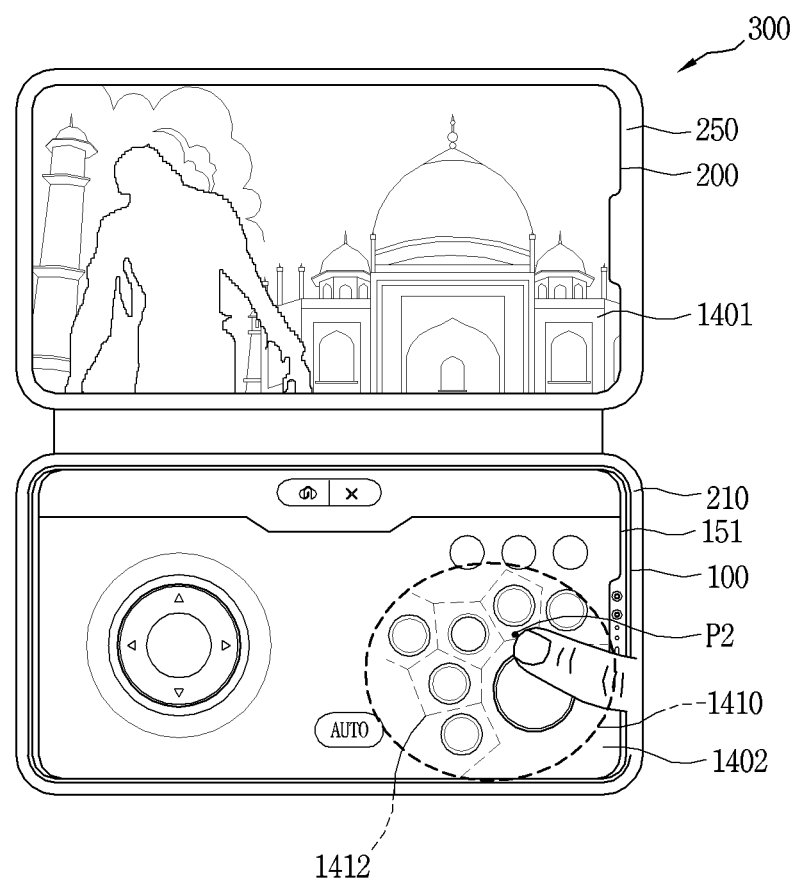

As illustrated in FIG. 14B, the controller of the mobile terminal 100 may set a virtual effective region 1410 having a predetermined size, i.e., an extended touch effective region, in all directions out of a boundary for the plurality of virtual keys, respectively, on the gamepad. Here, the virtual effective region 1410 may include a virtual boundary line 1412.

Then, the controller of the mobile terminal may recognize an effective region in which an initial touch point corresponding to the first touch event is located among the plurality of virtual effective regions 1410, and determine a specific virtual button corresponding to the recognized effective region as a virtual button selected according to the preset condition.

Meanwhile, although not shown, for another example, a touch position mapped for each type of gamepad may be stored and shared in a database or in the form of a file. In this case, when the database is accessed or a corresponding file is downloaded to be set, a position mapped for each type of the gamepad may be transmitted to the game application.

Here, it is determined whether the type of the gamepad on which a touch input applied outside a boundary of a virtual key or the like is present in a list of the game application being executed on another screen. When present, a touch event having predetermined coordinate values (x, y) assigned to each virtual key existing in the gamepad may be generated.

Then, the controller of the mobile terminal changes (assigns, or transmits) an input device of the generated touch event to an identification number of the device corresponding to the other display, thereby transmitting the generated touch event.

As described above, according to a mobile terminal and an electronic device having the mobile terminal according to the present disclosure, during the execution of a game application, a gamepad may be provided through an extended display region without using a separate peripheral device, thereby further improving user experience and realism during the execution of the game, and more efficiently controlling a play operation of the game application executed on the mobile terminal. In addition, a touch position of a touch event generated from the gamepad is transmitted to a manager of a game application corresponding to a game screen executed on another screen, and then a screen conversion or operation mapped thereto is applied to the game screen. Accordingly, usability is further improved even when the game screen and the gamepad are independently activated in different regions/screens/devices.

The invention claimed is:

1. An electronic device comprising:
a mobile terminal; and
a case coupled to the mobile terminal,
wherein the mobile terminal comprises:
  a terminal body coupled to the case;
  a first wired communication unit provided in the terminal body; and
  a first display coupled to the case,
wherein the case comprises:
  a first body disposed to accommodate at least a part of the terminal body;
  a second wired communication unit disposed at one side of the first body;
  a second body including a second display; and
  a wiring portion configured to electrically connect the first body and the second body to transmit a signal received from the mobile terminal to the second display when a wired communication path is formed based on a connection between the first and second wired communication units,
wherein the mobile terminal further comprises:
  a controller configured to:
    display a gamepad for playing a game application executed by the mobile terminal based on a touch input applied to either the first display or the second display while the first and second displays are in active states,
    receive a first touch input on the gamepad while a joystick application is being executed on the first display and the game application is being played on the second display,
    generate a first touch event based on the first touch input,
    in response to the first touch event satisfying a preset condition, generate a coordinate conversion corresponding to a second touch event, the coordinate conversion being based on the first touch event, and transmit the coordinate conversion to the game application, and
    control the coordinate conversion for the second touch event to be transmitted to the game application being executed on the second display in response to the first touch event generated from the gamepad displayed on the first display being converted into the second touch event, and
  wherein the present condition includes a situation where a touch position moves within a second threshold distance outside of a boundary of a virtual joystick.

2. The electronic device of claim 1, wherein the preset condition further includes a situation where the touch position corresponding to the first touch event is located inside the boundary of the virtual joystick displayed on the gamepad, a situation where the touch position moves within a first threshold distance based on an initial touch point of the first touch input, and
wherein the second touch event is generated based on the touch position of the first touch event.

3. The electronic device of claim 2, wherein controller is further configured to process the coordinate conversion for the second touch event as an input to the virtual joystick.

4. The electronic device of claim 2, wherein the first threshold distance is a value based on the initial touch point corresponding to a central axis of a circle, and
wherein the second threshold distance is a value based on the boundary of the virtual joystick.

5. The electronic device of claim 1, wherein the mobile terminal further comprises:
a converter configured to:
  receive a third touch event satisfying a second preset condition from a display on which the gamepad is being displayed,
  convert the third touch event to generate a coordinate conversion for a fourth touch event, and
  transmit the coordinate conversion for the fourth touch event to a gamepad application displaying the gamepad or the game application.

6. The electronic device of claim 1, wherein when the first touch event is initiated by the virtual joystick of the gamepad, and
wherein the controller is further configured to:
  ignore the boundary of the virtual joystick and perform coordinate conversion for successive touch points based on using a position of an initial touch point of the first touch event as a central axis of a circle to generate the coordinate conversion corresponding to the second touch event, and
  transmit the coordinate conversion corresponding to the second touch event to the game application.

7. The electronic device of claim 1, wherein the controller is further configured to:
in response to an initial position of the first touch event being located outside of a virtual button of the gamepad and within a predetermined distance away from a boundary of the virtual button, generate the coordinate conversion corresponding to the second touch event by converting coordinates of the first touch event to be within a boundary of the virtual button.

8. The electronic device of claim 1, wherein the controller is further configured to:
in response to the first touch event being initiated by a virtual button of the gamepad and including a drag touch that moves in a first direction away from an initial touch point corresponding to the first touch event and changes to move in a second direction opposite to the first direction, generate updated coordinates of a current touch point based on comparing areas of the initial touch point and the current touch point and generate the coordinate conversion corresponding to the second touch event based on the updated coordinates.

9. The electronic device of claim 1, wherein the controller is further configured to:

in response to the first touch event being initiated outside of a selected virtual button of the gamepad while a plurality of virtual buttons exist in a region adjacent to an initial touch point corresponding to the first touch event, generate updated coordinates of a touch point for the selected virtual button according to a second preset condition and generate the coordinate conversion corresponding to the second touch event.

10. The electronic device of claim 9, wherein the controller is further configured to:
in response to receiving a sequence of a first touch-down event being generated from a first virtual button of the gamepad, a touch-up event being generated outside of the first virtual button after the first touch-down event and a second touch-down event being generated after the touch-up event within an effective region from a touch point corresponding to the first touch-up event within a predetermined period of time, determine the first virtual button as the selected virtual button.

11. The electronic device of claim 1, wherein the controller is further configured to:
set a plurality of virtual effective regions of a predetermined size outside of the plurality of virtual buttons, respectively, on the gamepad,
recognize an effective region when an initial touch point corresponding to the first touch event is located in one of the plurality of virtual effective regions, and
determine a specific virtual button corresponding to the effective region as a selected virtual button.

12. The electronic device of claim 1, wherein the coordinate conversion corresponding to the second touch event includes a pair of X, Y coordinates, where X and Y are numerals.

13. The electronic device of claim 1, wherein the controller is further configured to:
convert the coordinate conversion corresponding to the second touch event including a movement distance based on an initial touch point of the first touch input and an angle centered on the initial touch point, and
provide the movement distance and the angle for the joystick application and the game application.

14. An electronic device comprising:
a first body including a first display;
a second body including a second display;
a wiring portion coupled between the first body and the second body; and
a controller configured to:
display a screen of a game application on the second display,
display a virtual gamepad on the first display for controlling the game application,
receive a first touch input on the virtual gamepad while the game application is being played on the first display and a joystick application is being executed on the second display,
generate a first touch event based on the first touch input,
in response to the first touch event satisfying a preset condition, generate coordinates corresponding to a second touch event and transmit the coordinates to the game application, and
control the coordinate conversion for the second touch event to be transmitted to the game application being executed on the second display in response to the first touch event generated from the gamepad displayed on the first display being converted into the second touch event, wherein the preset condition includes a second drag touch moving from a position within a boundary of a virtual joystick to an outside position located within a second threshold distance away from the boundary of the virtual joystick.

15. The electronic device of claim 14, wherein the coordinates corresponding to the second touch event include a pair of X, Y coordinates, where X and Y are numerals.

16. The electronic device of claim 14, wherein the coordinates corresponding to the second touch event include a movement distance based on an initial touch point of the first touch input and an angle centered on the initial touch point.

17. The electronic device of claim 14, wherein the preset condition further includes:
an initial touch point of the first touch input being located within the boundary of the virtual joystick displayed on the first display, or
a first drag touch starting from the initial touch point of the first touch input being located within the boundary of the virtual joystick and moving to a second touch point located within a first threshold distance away from the initial touch point.

18. The electronic device of claim 14, wherein the preset condition includes the first touch input being located with a virtual effective area set outside of and around a virtual button displayed on the first display.

19. A method of controlling an electronic device, the method comprising:
displaying a virtual gamepad on a first display included in a first body of the electronic device for controlling a game application;
displaying a screen of the game application on a second display included in a second body of the electronic device;
receiving a first touch input on the virtual gamepad while the game application is being played on the first display and a joystick application is being executed on the second display;
generating, via a controller in the electronic device, a first touch event based on the first touch input;
in response to the first touch event satisfying a preset condition among a plurality of preset conditions, generating, via the controller, coordinates corresponding to a second touch event and transmit the coordinates to the game application; and
controlling the coordinate conversion for the second touch event to be transmitted to the game application being executed on the second display in response to the first touch event generated from the gamepad displayed on the first display being converted into the second touch event,
wherein a wiring portion is coupled between the first body and the second body, and
wherein the plurality of preset conditions include:
an initial touch point of the first touch input being located within a boundary of a virtual joystick displayed on the first display,
a first drag touch starting from the initial touch point of the first touch input being located within the boundary of the virtual joystick and moving to a second touch point located within a first threshold distance away from the initial touch point, and
a second drag touch moving from a position within the boundary of the virtual joystick to an outside position located within a second threshold distance away from the boundary of the virtual joystick.

* * * * *